US012581040B2

(12) United States Patent
Park et al.

(10) Patent No.: US 12,581,040 B2
(45) Date of Patent: Mar. 17, 2026

(54) SYSTEMS AND METHODS FOR COORDINATED COLLECTION OF STREET-LEVEL IMAGE DATA

(71) Applicant: Lyft, Inc., San Francisco, CA (US)

(72) Inventors: Renee Park, San Francisco, CA (US); Saurabh Saraf, San Mateo, CA (US); Ramesh Rangarajan Sarukkai, Los Gatos, CA (US); Vinay Shet, Fremont, CA (US)

(73) Assignee: Lyft, Inc., San Francisco, CA (US)

( * ) Notice: Subject to any disclaimer, the term of this patent is extended or adjusted under 35 U.S.C. 154(b) by 179 days.

(21) Appl. No.: 17/846,577

(22) Filed: Jun. 22, 2022

(65) Prior Publication Data

US 2022/0353475 A1    Nov. 3, 2022

Related U.S. Application Data

(63) Continuation of application No. 16/890,377, filed on Jun. 2, 2020, now Pat. No. 11,405,590, which is a
(Continued)

(51) Int. Cl.
*G06F 9/00*      (2018.01)
*G06F 16/58*     (2019.01)
(Continued)

(52) U.S. Cl.
CPC ......... *H04N 7/181* (2013.01); *G06F 16/5866* (2019.01); *G06V 20/56* (2022.01);
(Continued)

(58) Field of Classification Search
CPC .. H04N 7/181; G06F 9/00791; G05D 1/0246; G08G 1/00
(Continued)

(56) References Cited

U.S. PATENT DOCUMENTS 8,612,465 B1    12/2013  Brewington
8,634,980 B1 *   1/2014  Urmson .................. G06T 7/521
                                                    701/23
(Continued)

FOREIGN PATENT DOCUMENTS

AU        2019236493 A1    10/2020
CA        3 0938 33 A1      9/2019
(Continued)

OTHER PUBLICATIONS

Non-Final Office Action received for U.S. Appl. No. 15/920,438 dated Aug. 10, 2018, 20 pages.
(Continued)

*Primary Examiner* — Jeffery A Williams
(74) *Attorney, Agent, or Firm* — Greenberg Traurig, LLP

(57) ABSTRACT

The disclosed computer-implemented method may include (i) identifying, by a server computer system, a provider computing device for use in capturing street-level image data, where the provider computing device controls a camera positioned to capture street-level imagery outside the vehicle, (ii) determining, by the server computer system, a configuration that controls use of the provider computing device to provide street-level image data captured by the camera to the server computer system, (iii) sending, by the server computer system, the configuration to the computing device, and (iv) receiving, from the computing device, street-level image data captured by the computing device using the camera responsive to the configuration. Various other methods, systems, and computer-readable media are also disclosed.

11 Claims, 14 Drawing Sheets

Map
100(a)

Map
100(b)

Related U.S. Application Data continuation of application No. 16/237,159, filed on Dec. 31, 2018, now Pat. No. 10,687,024, which is a continuation of application No. 15/920,438, filed on Mar. 13, 2018, now Pat. No. 10,218,941.

(51) Int. Cl.

| | |
|---|---|
| *G06V 20/56* | (2022.01) |
| *H04L 67/10* | (2022.01) |
| *H04N 1/00* | (2006.01) |
| *H04N 7/18* | (2006.01) |
| *H04N 23/661* | (2023.01) |
| *H04W 4/02* | (2018.01) |
| *H04W 4/40* | (2018.01) |
| *H04W 4/50* | (2018.01) |
| *G06V 20/58* | (2022.01) |

(52) U.S. Cl.
CPC .............. *H04L 67/10* (2013.01); *H04N 1/00* (2013.01); *H04N 7/183* (2013.01); *H04N 23/661* (2023.01); *H04W 4/02* (2013.01); *H04W 4/40* (2018.02); *H04W 4/50* (2018.02); *G06V 20/58* (2022.01)

(58) Field of Classification Search
USPC ........................................................ 348/148
See application file for complete search history.

(56) References Cited

U.S. PATENT DOCUMENTS

| | | | | |
|---|---|---|---|---|
| 9,613,455 | B1 * | 4/2017 | Nelson ................... | G06V 20/10 |
| 9,679,487 | B1 | 6/2017 | Hayward | |
| 9,836,962 | B1 | 12/2017 | Hayward | |
| 10,218,941 | B1 | 2/2019 | Park et al. | |
| 10,687,024 | B2 | 6/2020 | Park et al. | |
| 2002/0085095 | A1 | 7/2002 | Janssen | |
| 2009/0201370 | A1 | 8/2009 | Otsuka et al. | |
| 2014/0309789 | A1 | 10/2014 | Ricci | |
| 2015/0350607 | A1 | 12/2015 | Kim et al. | |
| 2016/0214533 | A1 * | 7/2016 | Doyle ................... | H04N 7/181 |
| 2017/0034110 | A1 | 2/2017 | Bijor et al. | |
| 2017/0183015 | A1 | 6/2017 | Phelan et al. | |
| 2018/0003511 | A1 | 1/2018 | Browing et al. | |
| 2018/0012091 | A1 | 1/2018 | Ricci | |
| 2018/0151066 | A1 * | 5/2018 | Oba ................. | G08G 1/096725 |
| 2018/0253424 | A1 | 9/2018 | Banerjee et al. | |
| 2023/0237799 | A1 * | 7/2023 | Mugura ................. | G01C 21/20 |

FOREIGN PATENT DOCUMENTS

| | | | |
|---|---|---|---|
| CN | 102506879 | A | 6/2012 |
| CN | 103507810 | A | 1/2014 |
| CN | 104965511 | A | 10/2015 |
| CN | 106799993 | A | 6/2017 |
| CN | 206475817 | U | 9/2017 |
| CN | 107272037 | A | 10/2017 |
| IL | 277289 | A | 10/2020 |
| JP | 2013120187 | A | 6/2013 |
| JP | 2017060164 | A | 3/2017 |
| WO | 2019/178168 | A1 | 9/2019 |

OTHER PUBLICATIONS

Notice of Allowance received for U.S. Appl. No. 15/920,438 dated Oct. 11, 2018, 26 pages.

Non-Final Office Action received for U.S. Appl. No. 16/237,159 dated Sep. 25, 2019, 23 pages.

Notice of Allowance received for U.S. Appl. No. 16/237,159 dated Apr. 6, 2020, 21 pages.

Non-Final Office Action received for U.S. Appl. No. 16/890,377 dated Aug. 31, 2020, 28 pages.

Final Office Action received for U.S. Appl. No. 16/890,377 dated Feb. 24, 2021, 31 pages.

Non-Final Office Action received for U.S. Appl. No. 16/890,377 dated May 25, 2021, 28 pages.

Notice of Allowance received for U.S. Appl. No. 16/890,377 dated Mar. 22, 2022, 29 pages.

International Search Report and Written Opinion received for PCT Application Serial No. PCT/US2019/021947 dated Jul. 2, 2019, 11 pages.

Examination Report No. 1 received for Australian Patent Application Serial No. 2019236493 dated Sep. 29, 2020, 4 pages.

First Office Action received for Canadian Patent Application Serial No. 3,093,833 dated Oct. 27, 2020, 9 pages.

International Preliminary Report on Patentability received for PCT Application Serial No. PCT/US2019/021947 dated Sep. 24, 2020, 8 pages.

Second Office Action received for Canadian Patent Application Serial No. 3,093,833 dated Mar. 11, 2021, 7 pages.

First Office Action received for Chinese Patent Application No. 201980032116.4 dated Aug. 19, 2022, 10 pages (including English Translation).

Extended European Search Report received for Application No. 19767956.6 dated Nov. 12, 2021, 9 pages.

* cited by examiner

Method
1100

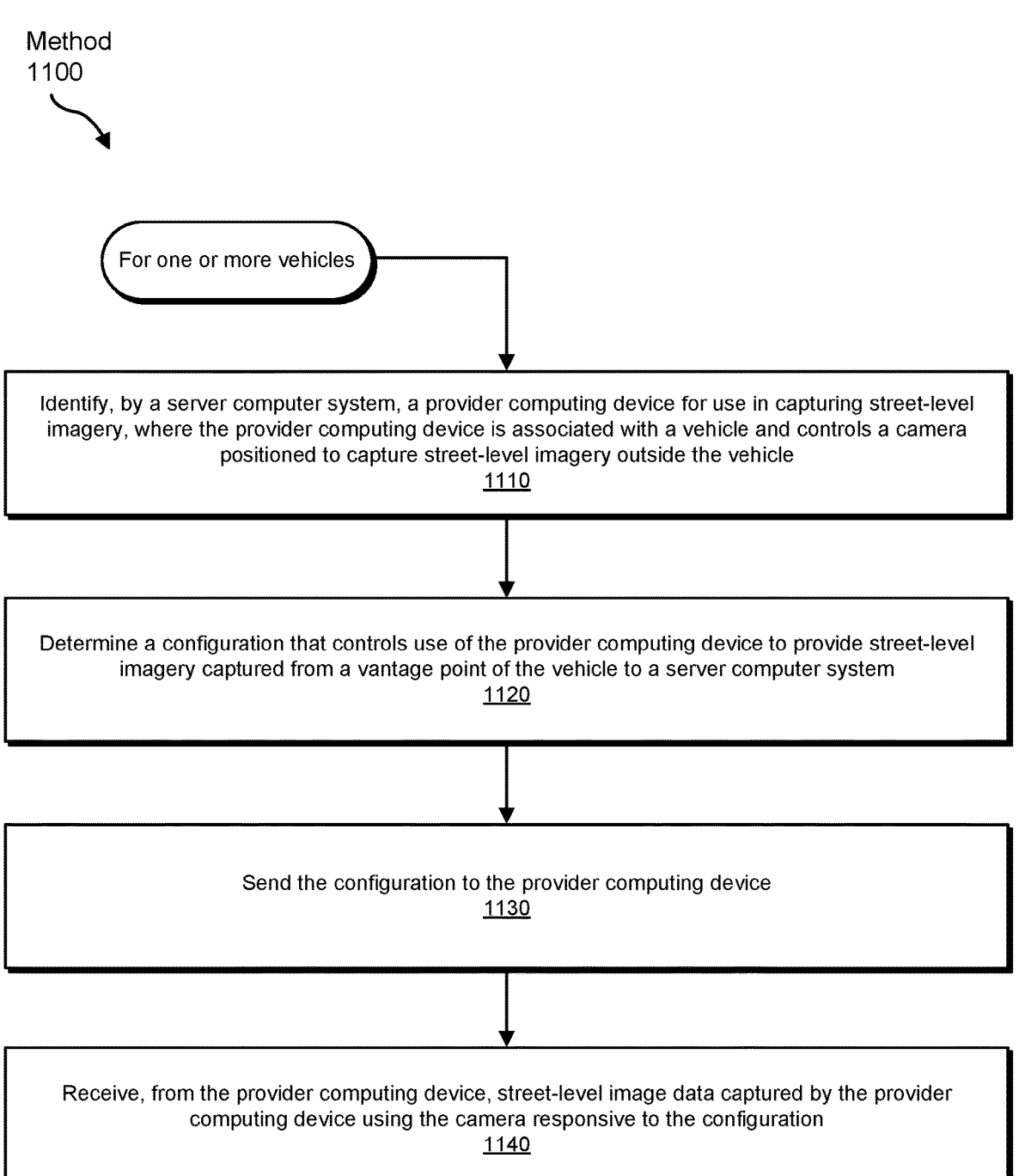

For one or more vehicles

Identify, by a server computer system, a provider computing device for use in capturing street-level imagery, where the provider computing device is associated with a vehicle and controls a camera positioned to capture street-level imagery outside the vehicle
1110

Determine a configuration that controls use of the provider computing device to provide street-level imagery captured from a vantage point of the vehicle to a server computer system
1120

Send the configuration to the provider computing device
1130

Receive, from the provider computing device, street-level image data captured by the provider computing device using the camera responsive to the configuration
1140

*FIG. 11*

Method
1200

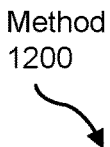

Connect, from a provider computing device associated with a vehicle, to a server computer system, where the provider computing device controls a camera positioned to capture street-level imagery outside of the vehicle
1210

Receive, by the provider computing device and from the server computer system, a configuration that controls use of the provider computing device to provide street-level image data captured by the camera to the server computer system
1220

Determine, based on sensor data accessed by the provider computing device and responsive to the configuration, that a condition is met to use the provider computing device to provide street-level image data from a street-level image viewed by the camera to the server computer system
1230

Use a resource of the provider computing device to provide the street-level image data to the server computer system based on determining that the condition is met
1240

SYSTEMS AND METHODS FOR COORDINATED COLLECTION OF STREET-LEVEL IMAGE DATA

CROSS REFERENCE TO RELATED APPLICATION

This application is a continuation of and claims the benefit of U.S. application Ser. No. 16/890,377, filed 2 Jun. 2020, which is a continuation of and claims the benefit of U.S. application Ser. No. 16/237,159 (now U.S. Pat. No. 10,687,024), filed 31 Dec. 2018, which is a continuation of and claims the benefit of U.S. application Ser. No. 15/920,438 (now U.S. Pat. No. 10,218,941), filed 13 Mar. 2018, the disclosures of both of which are incorporated, in their entirety, by this reference.

BACKGROUND

In the age of personal computing, digital platforms and services have become increasingly integrated with everyday life. Accordingly, these platforms and services often rely on real-world data. For instance, digitally collected and stored street-level imagery now provides countless individuals and corporations with a view into their neighborhoods, cities, and highways.

However, street-level image capture can be an expensive process. Traditional approaches include purchasing dedicated fleets of vehicles with specialized cameras and hiring drivers to take predetermined routes to capture imagery deemed most important. Unfortunately, the resulting coverage may not be adequate for all purposes, as some streets may be neglected due to time or cost constraints. In addition, imagery data may quickly become stale as streets and their surrounding environments change.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 11 is a flow diagram of an exemplary method for collecting street-level image data.

FIG. 12 is a flow diagram of another exemplary method for collecting street-level image data.

Figure 1:
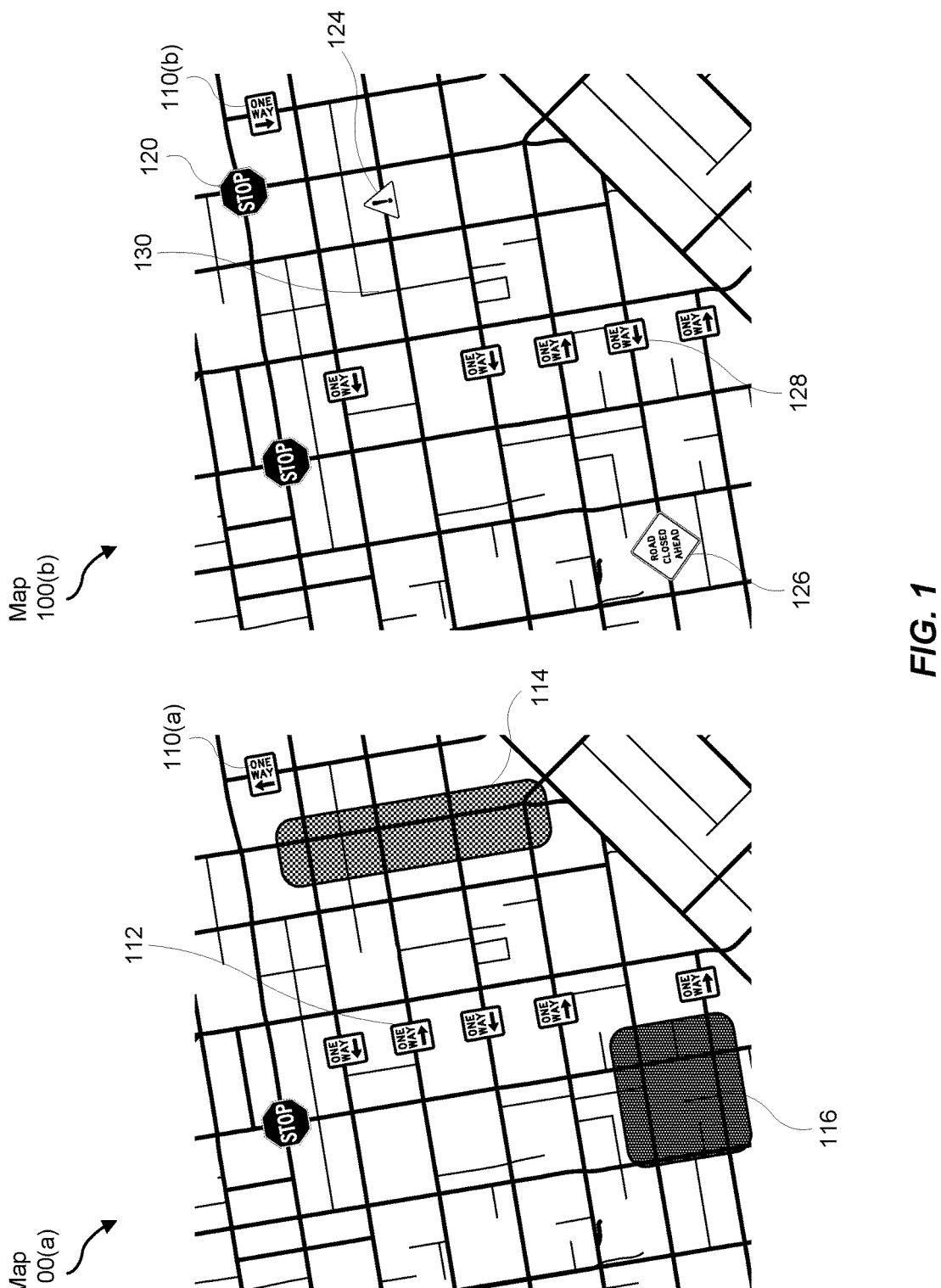
FIG. 1 is an illustration of exemplary map inaccuracies.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to collecting street-level image data. As will be explained in greater detail below, embodiments of the instant disclosure may configure and/or coordinate the collection of street-level image data across a number of vehicles. For example, a remote server computer may communicate with camera-equipped devices in a group of vehicles and configure each of the camera-equipped devices with custom image-collection instructions based on the attributes of the camera-equipped devices and/or dynamically determined image collection needs.

As will be discussed in greater detail below, by (i) leveraging existing mobile devices (e.g., owned and already used by transportation providers) to adaptively collect street-level image data based on conditions triggered by mobile device sensor data and (ii) coordinating the collection of street-level image data across the drivers with a server computer system that dynamically configures the mobile devices to optimize aggregate image collection performance (while avoiding negative impacts to primary transportation matching applications), the systems and methods described herein may enable high levels of street-level image collection coverage and refresh. In addition, these systems and methods may enable real-time (or near real-time) use of collected image data (e.g., to provide additional and improved functionality to transportation matching platforms).

As an example, a group of transportation providers (also referred to as "ride providers," "service providers," or simply "providers") may participate in a dynamic transportation matching service by using a transportation matching application on their mobile devices that matches transportation providers with transportation requestors and/or that provides navigation assistance as transportation providers pick up and drop off transportation requestors (also referred to as "ride requestors," "service requestors," or simply "requestors"). Since the providers may mount their mobile devices on their vehicles' dashboards (e.g., to make better use of the transportation application), the systems and methods described herein may use the rear-facing cameras on the mobile devices to take street-level images as the providers travel to pick up and drop off requestors. As will be described in greater detail below, by providing custom image-collection instructions to the mobile devices from a remote server computer, the systems and methods described herein may make adaptive and/or coordinated decisions about when and how to capture street-level images in order to maximize the quantity and quality of image data captured while minimizing interference with the drivers' mobile devices or the performance of the transportation matching application.

In addition, as will be described in greater detail below, by specifying conditions under which the mobile devices are to capture images and/or upload image data, the systems and methods described herein may leverage any of a variety of mobile computing device sensors to determine when to spend mobile device resources to collect image data. In some examples, by leveraging existing provider participation and mobile device use, the systems and methods described herein may collect street-level image data with high levels of relevant coverage (e.g., along all streets that providers in a transportation matching network travel) and high rates of refresh (e.g., potentially refreshing street-level image data on a weekly or a daily basis). In addition, in some examples, the systems and methods described herein may use street-level image data for real-time or near real-time applications (e.g., to provide additional and/or improved functionality to transportation matching applications). For example, the systems and methods described herein may use street-level image data to improve matches performed by a transportation matching system between ride requestors and ride providers (e.g., by using street-level image data to provide real-time updates and/or enhancements to street data for use in estimating travel times and/or route availability for providers). As another example, the systems and methods described herein may use street-level image data to improve vehicle navigation systems (e.g., by using street-level image data to perform real-time updates and/or enhancements to street data for use in selecting routes and/or estimating travel times). In some examples, the systems and methods described herein may improve localization systems (e.g., by using street-level image data to more accurately determine the location of a provider vehicle based on recognized landmarks). In addition, in some examples the systems and methods described herein may improve mapping systems (e.g., by using street-level image data to identify and correct omissions and/or errors in map data).

Furthermore, the systems and methods described herein may improve the functioning of a computer itself by selectively using computing resources to capture, process, store, and/or upload street-level images, thereby preventing degradation of the performance of the computer that may otherwise be caused by street-level image collection. For example, the systems and methods described herein may reduce the consumption of the battery power, storage space, storage input/output bandwidth, network bandwidth, and/or processor capacity of the computer by only capturing, storing, and uploading street-level images under specified conditions. In some examples, the systems and methods described herein may improve the functioning of a computer itself by preventing interference with the performance of a transportation matching application due to street-level image data collection (e.g., by ensuring that street-level image data collection does not consume computer resources needed for the transportation matching application to operate reliably and effectively).

In one example, a server computer system may, for one or more vehicles, (i) identify a provider computing device for use in capturing street-level imagery, where the provider computing device is associated with the vehicle and controls a camera positioned to capture street-level imagery outside of the vehicle, (ii) determine a configuration that controls use of the provider computing device to provide street-level image data captured from a vantage point afforded to the camera by the vehicle to the server computer system, (iii) send the configuration to the provider computing device, and (iv) receive, from the provider computing device, street-level image data captured by the provider computing device using the camera responsive to the configuration.

The configuration of the provider computing device may control the use of the provider computing device (e.g., use of the camera, storage, and/or network resources) in any of a variety of ways. In some examples, the configuration may control the use of the provider computing device to provide street-level image data based at least in part on sensor data received by the provider computing device. For example, the sensor data may indicate a geolocation of the provider computing device and the configuration may specify at least one geolocation associated with a rule for controlling use of the provider computing device to provide street-level image data.

The server computer system may determine the configuration to send to a computing device based on any of a variety of factors. For example, the server computer system may determine the configuration by identifying a collection objective for street-level image data based on one or more data collection rules. The server computer system may also determine that a set of provider computing devices associated with corresponding vehicles match the data collection rules. The server computer system may, thus, determine a configuration for each of the set of provider computing devices such that the set of provider computing devices are collectively configured to meet the collection objective. Determining the individual configuration for each of the set of provider computing devices may be based on any of a variety of factors. For example, the server computer system may determine the individual configurations by receiving capability data from the provider computing device associated with the vehicle and capability data from at least one alternate computing device associated with an alternate vehicle within the plurality of vehicles. The server computer system may then optimize the individual configuration for each of the set of provider computing devices based on the capability data from the provider computing device and the capability data from the alternate provider computing device. In some examples, the capability data from the provider computing device and alternate computing device may describe computing capabilities of the respective devices. Additionally or alternatively, the capability data may describe the views available to the cameras of the respective devices (e.g., due to differing vantage points provided by the vehicles of the respective devices).

In some examples, the provider computing device used to collect image data may include a provider application. In these examples, the server computer system may transmit instructions to the provider application based at least in part on street-level image data received from a different computing device associated with a different vehicle.

According to some embodiments, the server computer system may update the configuration of the provider computing device based on the street-level image data. For example, the server computer system may update the configuration to cause the provider computing device to provide additional street-level image data related to the street-level image data. The server computer system may then receive the additional street-level image data from the provider computing device.

The configuration that controls the use of the provider computing device to provide street-level image data may control the use of various resources of the provider computing device. For example, the configuration may control the use of the provider computing device to capture street-level images with the camera. Additionally or alternatively, the configuration may include at least one condition for the provider computing device to upload, to the server computer system, street-level images captured with the camera. For example, the condition may include a specified type of network connection for uploading the street-level images, a specified network transfer capacity available to the provider computing device, a specified amount of time since a previous upload of street-level images, a specified battery level of the provider computing device, and/or a specified memory capacity available to the provider computing device.

In another example, a computing device associated with a vehicle may connect to a server computer system that coordinates image data collection across a group of vehicles, where the provider computing device controls a camera positioned to view street-level imagery outside the vehicle. The provider computing device may also receive, from the server computer system, a configuration that controls use of the provider computing device to provide street-level image data captured by the camera to the server computer system. The provider computing device may further determine, based on sensor data accessed by the provider computing device and responsive to the configuration, that a condition is met to use the provider computing device to provide street-level image data from a street-level image viewed by the camera to the server computer system. The provider computing device may then use a resource of the provider computing device to provide the street-level image data to the server computer system based on determining that the condition is met.

The provider computing device may conditionally use any of a variety of resources to provide the street-level image data to the server computer system. For example, the provider computing device may capture the street-level image with the camera (e.g., thereby using the camera and/or a storage device) based on determining that the condition is met. Additionally or alternatively, the provider computing device may upload the street-level image data to the server computer system (e.g., thereby using a network connection) based on determining that the condition is met.

In some examples, the provider computing device associated with the vehicle may include a provider application. In these examples, use of the provider computing device's resources may be further controlled (e.g., as specified by the configuration) to avoid interference with the performance of the provider application.

According to some embodiments, the provider computing device may preprocess the street-level image to extract one or more features from the street-level image. Accordingly, the street-level image data uploaded by the provider computing device to the server computer system may include metadata describing the extracted feature.

The provider computing device may determine that the condition for using a resource to provide street-level image data to the server computer system is met using any of a variety of sensor data. In some examples, the provider computing device may determine that the condition is met by determining, based on sensor data accessed by the provider computing device, that the vehicle is involved in an unpredicted event. In some embodiments, the provider computing device may determine that the condition is met by determining that the street-level image viewed by the camera includes information not represented by map data accessible to the provider computing device.

FIG. 1 illustrates a map 100(*a*) and a map 100(*b*) representing the same city region. In some examples, map 100(*a*) may provide a representation of the city region that is out-of-date or otherwise includes errors and/or omissions.

For example, a one-way street designation 110(*a*) represented in map 100(*a*) may be incorrect, whether because it has become out-of-date or because it was incorrectly determined at the time map 100(*a*) was generated. Instead, as shown in map 100(*b*) a one-way street designation 110(*b*) may represent the same street accurately. As another example, a one-way street designation 112 represented in map 100(*a*) may be incorrect, where map 100(*b*) may accurately show no one-way street designation for the same street. In a further example, a one-way street designation 128 that is accurately represented in map 100(*b*) may be missing from map 100(*a*). Similarly, a stop sign 120 that is accurately represented in map 100(*b*) may be missing from map 100(*a*). In an additional example, a road segment 130 may be missing from map 100(*a*) (e.g., because road segment 130 was added after data for map 100(*a*) was gathered).

As shown above, map 100(*a*) may fail to accurately represent all of the long-term street features of the city region (such as those typically corresponding to permanent road signs and signals). In addition, map 100(*a*) may fail to account at all for short-term, temporary, and/or transient features of the city region that may nevertheless be useful to some applications of street-level data. For example, as shown in FIG. 1, a road closure designation 126 shown in map 100(*b*) may be missing from map 100(*a*). Likewise, a transient event 124 (e.g., an accident, a crowd in the streets, etc.) shown in map 100(*b*) may be missing from map 100(*a*).

Furthermore, street-level images associated with map 100(*a*) may be incomplete or inconsistent in quality. For example, street-level images taken in an area 114 may have been low resolution, blurry, or otherwise lacking sufficient quality for certain applications. In addition, map 100(*a*) may lack any street-level images associated with an area 116.

As will be explained in greater detail below, the systems and methods described herein may gather street-level image data with a high degree of completeness, recency, and/or accuracy, e.g., as shown in map 100(*b*) and as opposed to map 100(*a*). In some examples, the systems and methods described herein may also gather street-level image data with sufficient frequency and responsiveness to reliably capture many short-term, temporary, and/or transient features, as shown in map 100(*b*) and as opposed to map 100(*a*). As such, embodiments described herein may provide efficient methods for accurately and responsively capturing and analyzing the present condition and activity of a city and/or a region's streets, sidewalks, highways, and/or any other vehicle accessible areas in real-time. For example, by limiting the use and capturing of such street-level images to those areas, times, events, and/or conditions associated with the objectives of the transportation management system, various embodiments disclosed herein may save resources and efficiently capture large areas without requiring constant use of resources in a region. Instead, in some embodiments, systems described herein may identify and target available resources for capturing relevant street-level images to accomplish an identified objective using the least amount of resources possible across the least number of providers and at the highest possible accuracy. Accordingly, the street-level imagery collected by the systems and methods described herein may be reliable and useful for applications such as localization, pickup and drop-off location and experience determinations, mapping, navigation, routing, travel time determinations, traffic identification, provider and requestor matching, event awareness, and/or machine learning.

Figure 2:
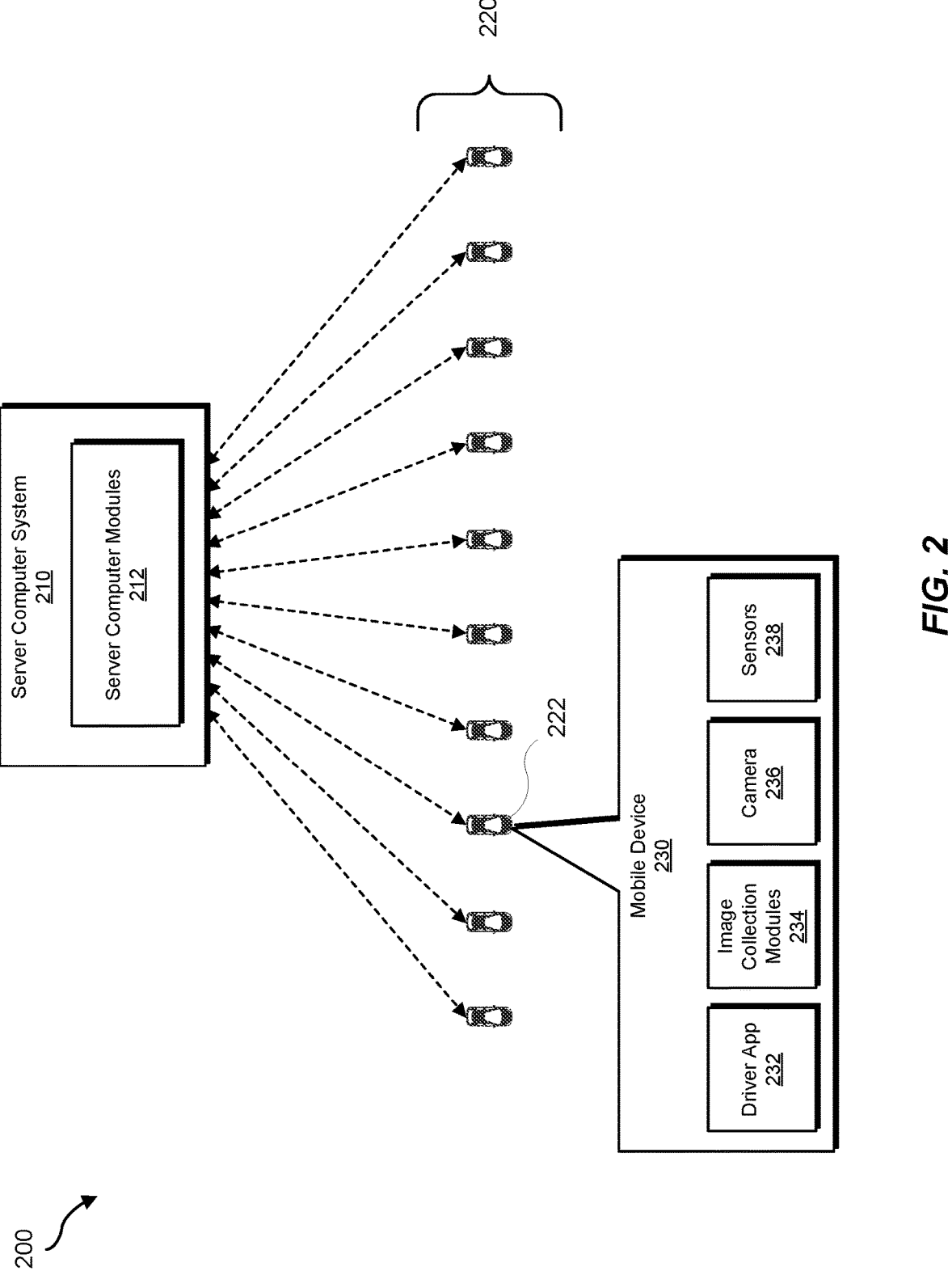
FIG. 2 is a diagram of an exemplary system for collecting street-level image data.

FIG. 2 illustrates an exemplary system 200 for collecting street-level image data. As shown in FIG. 2, a server computer system 210 may be configured with one or more server computer modules 212 that may perform one or more of the steps described herein. Server computer system 210 may represent any computing system and/or set of computing systems capable of coordinating street-level image data collection and/or storing collected street-level image data. Server computer system 210 may be in communication with computing devices in each of a group of vehicles 220. Vehicles 220 may represent any vehicles from which street-level images may be captured. In some examples, vehicles 220 may include disparate vehicle models. In addition, in some examples, many or all of vehicles 220 may be standard commercially available vehicles (without, e.g., substantial aftermarket modifications beyond consumer-friendly internal mounts for electronic devices). According to some examples, many or all of vehicles 220 may be owned by separate individuals (e.g., ride providers). Furthermore, while, in some examples, many or all of vehicles 220 may be human-operated, in some examples many or all of vehicles 220 may be autonomous (or partly autonomous). Accordingly, throughout the instant disclosure, references to a "ride provider" (or "provider") may, where appropriate, refer to an autonomous vehicle, an owner of an autonomous vehicle, an operator of an autonomous vehicle, an attendant of an autonomous vehicle, and/or an autonomous system for piloting a vehicle. For example, a navigation system said to aid a driver in navigating a vehicle may be understood as a navigation system adapted to aid a human driver and/or a navigation system adapted to aid an autonomous system (and/or a human attendant who accompanies an autonomous vehicle). While FIG. 2 depicts ten vehicles 220, it may be readily appreciated that the systems described herein are applicable to hundreds of vehicles, thousands of vehicles, or more. In one example, server computer system 210 may collect image data from 50,000 vehicles or more on a given day.

As mentioned above, server computer system 210 may communicate with computing devices in each of vehicles 220. The computing devices may be any suitable type of computing device. In some examples, one or more of the computing devices may be mobile devices. For example, one or more of the computing devices may be smartphones. Additionally or alternatively, one or more of the computing devices may be tablet computers, personal digital assistants, or any other type or form of mobile computing device. In some examples, one or more of the computing devices may be devices suitable for temporarily mounting in a vehicle (e.g., for use by a provider for a transportation matching application, a navigation application, and/or any other application suited for the use of providers). Additionally or alternatively, one or more of the computing devices may be devices suitable for installing in a vehicle and/or may be a vehicle's computer that has a transportation management system application installed on the computer in order to perform the functionality described herein. According to some examples, one or more of the computing devices may include wearable computing devices (e.g., a driver-wearable computing device), such as smart glasses, smart watches, etc.

To provide an example of a computing device that may be in communication with server computer system 210, FIG. 2 shows a vehicle 222 including a mobile device 230. As will be explained in greater detail below, mobile device 230 (and, e.g., similar devices situated in the rest of vehicles 220) may perform one or more of the steps described herein. In some examples, mobile device 230 may include a driver app 232. Driver app 232 may represent any application, program, and/or module that may provide one or more services related to operating a vehicle and/or providing transportation matching services. For example, driver app 232 may include a transportation matching application for providers. In some examples, driver app 232 may match the user of driver app 232 (e.g., a ride provider) with ride requestors. Additionally or alternatively, driver app 232 may match the user of driver app 232 with a requestor. In addition, and as is described in greater detail below, driver app 232 may provide a transportation management system with information about a provider (including, e.g., the current location of the provider) to enable the transportation management system to provide dynamic transportation matching and/or management services for the provider and one or more requestors. In some examples, driver app 232 may coordinate communications and/or a payment between a requestor and a provider. According to some embodiments, driver app 232 may provide a map service, a navigation service, a traffic notification service, and/or a geolocation service.

In addition to driver app 232, mobile device 230 may include image collection modules 234. As will be described in greater detail below, image collection module 234 may perform one or more of the steps described herein involved in capturing street-level images and/or uploading related image data to a server computer system. Although image collection modules 234 are portrayed as separate from driver app 232 in FIG. 2, in some examples one or more of image collection modules 234 may operate as a part of driver app 232. In some examples, one or more of image collection module 234 may operate as a separate application.

Mobile device 230 may also include a camera 236. In some examples, camera 236 may represent an integrated device. For example, camera 236 may be a rear-facing camera in a smartphone. In addition to camera 236, mobile device 230 may include sensors 238. Sensors 238 may include any of a variety of sensors, including, e.g., any sensor that may be found in a smartphone or mobile computing device. For example, sensors 238 may include an accelerometer, a gyroscope, a global positioning system (GPS), a magnetometer, a barometer, a light sensor, a wireless radio adapter (e.g., for wireless local area networking such as a WI-FI adapter, for short-distance data exchange such as a BLUETOOTH adapter, for long distance communication such as a cellular network card, etc.), and/or a microphone. In addition, while camera 236 is depicted as separate from sensors 238, sensors 238 may also include camera 236 and/or any other cameras that form a part of mobile device 230. In some examples, mobile device 230 may be in communication with one or more other devices within vehicle 222 (e.g., via wireless communication). In these examples, mobile device 230 may have direct and/or indirect access to additional sensor data from the other devices. Accordingly, sensors 238 may also be understood to include sensors within the vehicle accessible to mobile device 230.

Figure 3:
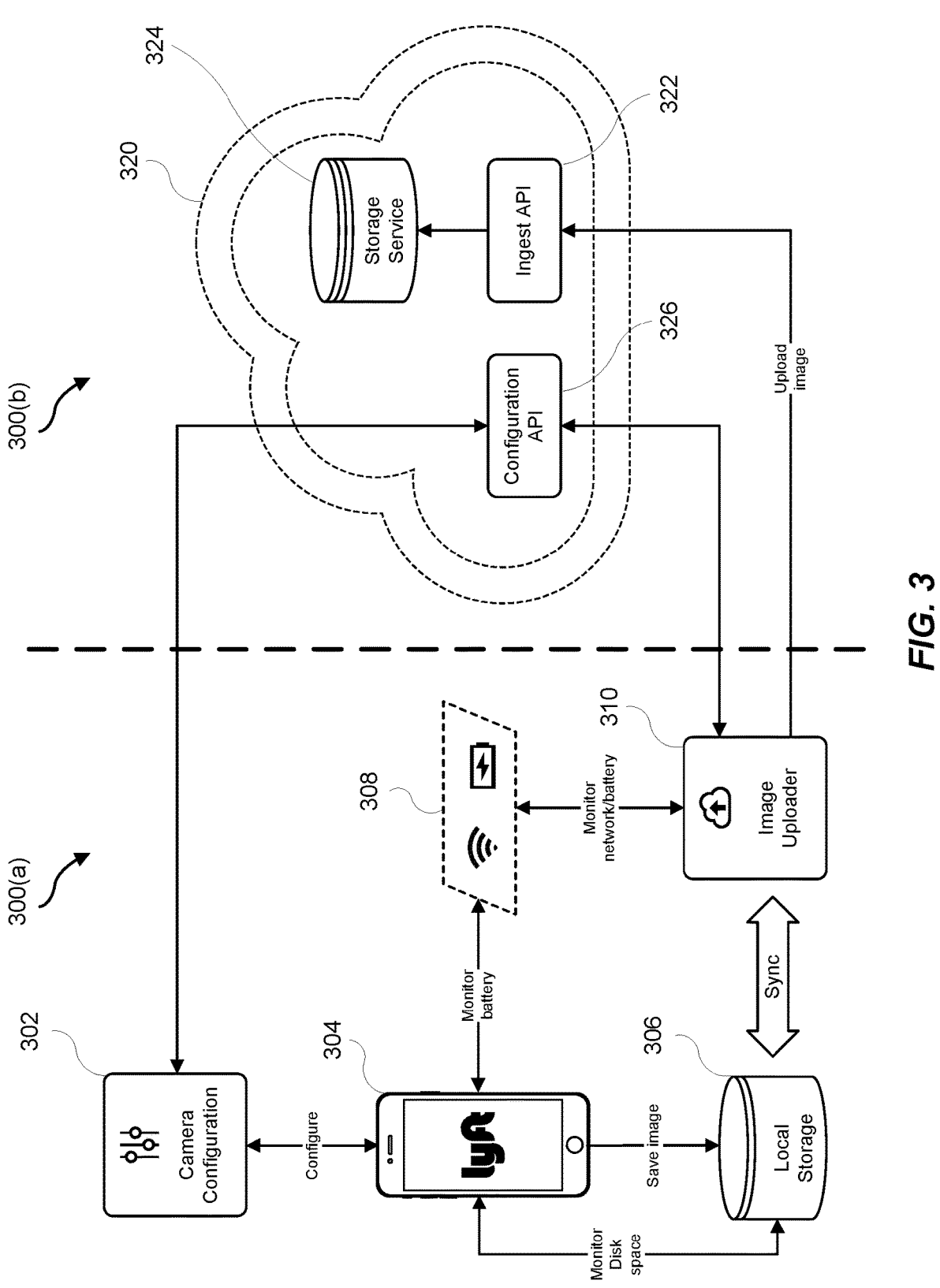
FIG. 3 is a diagram of an exemplary system for collecting street-level image data.

FIG. 3 illustrates an image collection system with a client-side 300(a) in communication with a service-side 300(b). As shown in FIG. 3, a client-side device 304 may receive a camera configuration 302 via a configuration application programming interface (API) 326 of a transportation matching system 320. Device 304 may, based at least in part on camera configuration 302, capture images and store the images to a local storage 306. A client-side image uploader 310 may upload images stored on local storage 306 to transportation matching system 320 via an ingest API 322 to be stored by a storage service 324. Configuration API 326 may also configure image uploader 310 regarding, e.g., under what conditions to upload images. Because device 304 may have limited resources and may devote at least some resources to an important application (e.g., a transportation matching application), device 304 may monitor its resources (e.g., monitor disk space available in local storage 306, monitor other resources 308, including battery level and network resources) to limit the rate at which images are stored to local storage 306 and/or uploaded via image uploader 310.

Figure 4:
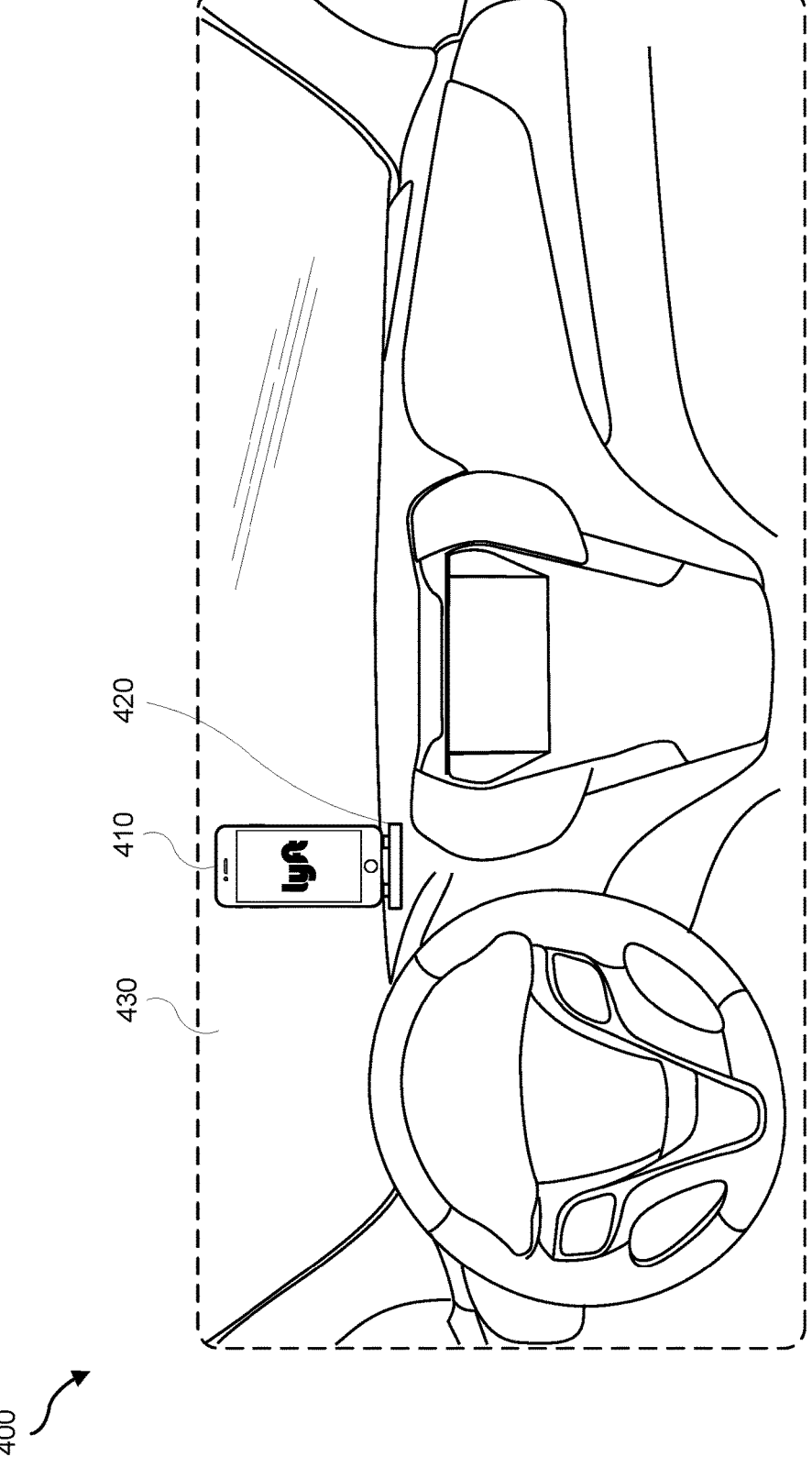
FIG. 4 is an illustration of an exemplary vehicle dashboard with a mounted computing device.

FIG. 4 illustrates an example vehicle dashboard 400. As shown in FIG. 4, a mobile device 410 may be mounted on vehicle dashboard 400 via a mount 420. A driver may thereby have convenient access to view and/or interact with a driving application (e.g., a transportation matching application) executing on mobile device 410. In addition, the placement of mobile device 410 may provide a rear-facing camera of mobile device 410 with a view through a windshield 430 outside the vehicle. In some examples, mount 420 may be designed to position mobile device 410 (and, e.g., other models of mobile devices) for suitable and consistent street-level image collection. Additionally or alternatively, in some examples one or more of the systems described herein may present a user of mobile device 410 with a calibration interface to instruct the user in adjusting mobile device 410 and/or mount 420 for a suitable view for street-level image collection.

In some examples, mobile device 410 may display an indicator and/or a notification that informs the driver when mobile device 410 is collecting street-level image data. In this manner, the driver may better understand how mobile device 410 is being used and/or may be more aware of impacts of street-level image collection on the performance and/or resource capacity of mobile device 410.

Figure 5:
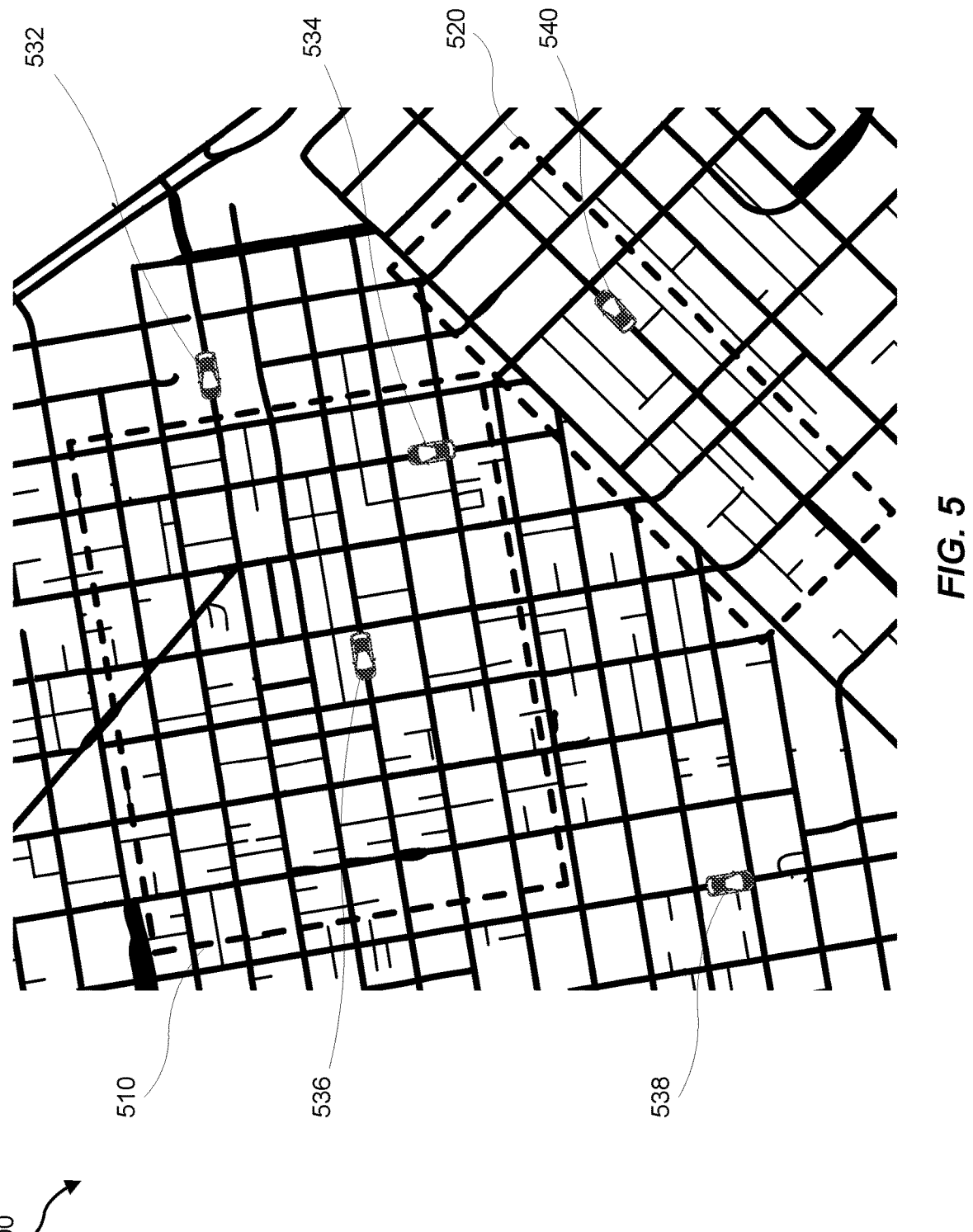
FIG. 5 is an illustration of an exemplary geofencing map.

As an example of geolocation-based image collection, FIG. 5 illustrates an example geofencing map 500. As shown in FIG. 5, vehicles 532, 534, 536, 538, and 540 (e.g., all with computing devices in communication with the server computer system) may be in different locations within a city region. In addition, portions of the city region may fall within geofences. For example, a geofence 510 may include vehicles 534 and 536, while a geofence 520 may include vehicle 540. Vehicles 532 and 538 may not fall within any geofence. In one example, geofences 510 and 520 may specify areas of interest for street-level image collection. Accordingly, computing devices in vehicles 534, 536, and 540 may capture street-level images while within their respective geofences. However, vehicles 532 and 538 may capture no street-level images. In some examples, the provider computing devices in each of vehicles 532, 534, 536, 538, and 540 may have information specifying the locations of the geofences and periodically compare their current locations against the geofence information to determine whether or not to capture images. Additionally or alternatively, the provider computing devices may periodically inform the server computer system of their current locations and receive, in response, configurations specifying whether or not to capture street-level images. In some examples, instead of representing areas for street-level image collection, geofences 510 and 520 may represent areas where no street-level image collection is needed. In these examples, vehicles outside geofences 510 and 520 (e.g., vehicles 532 and 538) may capture street-level images while vehicles 534, 536, and 540 capture none.

Figure 6:
FIG. 6 is an illustration of an exemplary heatmap.

As another example of geolocation-based image collection, FIG. 6 illustrates a heatmap 600. As shown in FIG. 6, vehicles 632, 634, 636, 638, and 640 may be in different locations within a city region. In addition, portions of the city region may fall within different gradients of heatmap 600. For example, areas 610 and 612 may represent high-intensity areas. An area 614 may represent a very high intensity area. An area 616 may represent a very low intensity area. The remaining area within heatmap 600 may represent a normal level of intensity. At higher levels of intensity, computing devices in vehicles may, e.g., capture more images, process and/or upload images at a higher priority (e.g., be placed in a higher-priority queue, upload via cellular data, etc.), and/or capture images with a higher resolution. At lower levels of intensity, computing devices in vehicles may, e.g., capture fewer images, process and/or upload images at a lower priority (e.g., be placed in a lower-priority queue, upload only via WI-FI, etc.), and/or capture images at a lower resolution. As shown in FIG. 6, the provider computing device in vehicle 636 may, e.g., capture images at a very high rate. Vehicles 634 and 640 may capture images at a high rate. Vehicle 632 may capture images at a normal and/or default rate. Vehicle 638 may capture images at a slow rate and/or only capture images based on specific conditions (e.g., observing an unusual and/or unexpected image, such as an apparent change to street signage within area 616).

Heatmap 600 may be generated based on any of a variety of criteria. For example, heatmap 600 may represent, in part, the importance of street-level image data for varying areas (e.g., based on levels of use of street-level image data for the varying areas). Additionally or alternatively, heatmap 600 may represent, in part, the amount of street-level image data recently collected (and/or expected to be collected) for the varying areas (e.g., reducing street-level image collection priority for areas with redundant coverage). For example, server computer system 210 may determine that a large number of image-collecting vehicles have passed and/or are expected to pass through area 616, and so may reduce the rate of collection of street-level image data in area 616 (thereby, e.g., freeing the resources of the provider computing device in vehicle 638 to collect street-level images at a higher rate when passing through a higher priority area).

Figure 7:
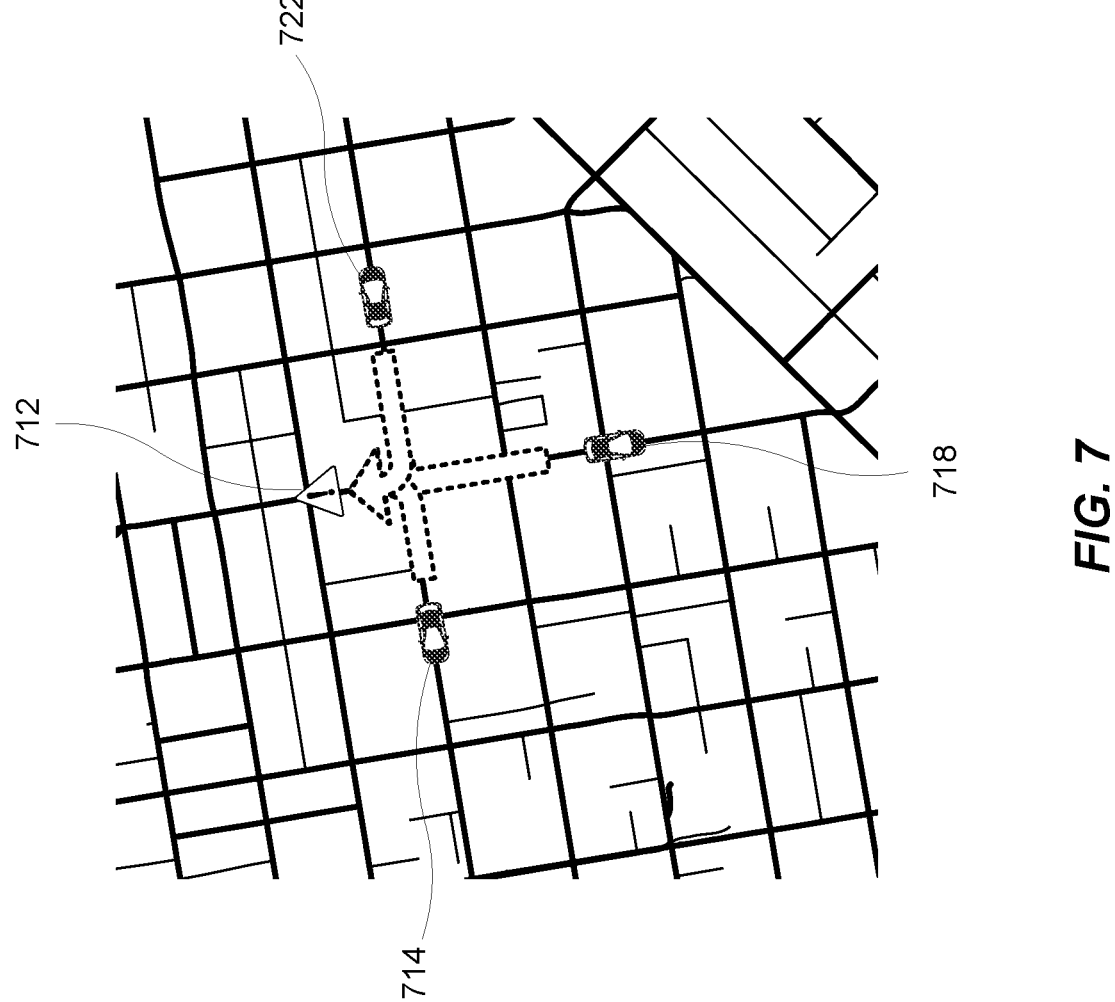
FIG. 7 is an illustration of an exemplary scenario of street-level image collection.

In some examples, mobile device 230 may collect images based not only on the location of vehicle 222 but the bearing of vehicle 222 (e.g., as observed by mobile device 230). Using FIG. 7 as an example, vehicles 714, 718, and 722 may each be routed to travel toward a point of interest 712. However, vehicle 714 may approach point of interest 712 by turning left, vehicle 722 may approach point of interest 712 by turning right, and vehicle 718 may approach point of interest 712 straight on from a distance. Accordingly, each of vehicles 714, 718, and 722 may have the advantage of views of point of interest 712 that the remaining vehicles may lack. Accordingly, the provider computing devices of the respective vehicles may collect images from their distinct approaches toward point of interest 712. In some examples, server computer system 210 may instruct vehicles 714, 718, and 722 to collect the images, recognizing that the images will not be redundant due to the different approaches. Additionally or alternatively, vehicles 714 and 722 may take images at a higher rate while turning on the premise that images with intermediate bearings are generally more difficult to acquire (e.g., because vehicles may typically approach a location past an intersection by traveling straight through the intersection rather than turning at the intersection toward the location). In some examples, server computer system 210 may use historical data (e.g., past street-level image data collected from provider computing devices)

to determine the direction from which vehicles (or, e.g., provider vehicles specifically) typically tend to approach a location. In one example, server computer system 210 may determine that vehicles frequently approach point of interest 712 by driving straight through the preceding intersection or by turning right (e.g., the approaches taken by vehicles 718 and 722, respectively) but infrequently approach point of interest 712 by turning left (e.g., the approach taken by vehicle 714). Accordingly, in this example, server computer system 210 may configure the provider computing device in vehicle 714 to aggressively capture street-level image data (e.g., at a high rate and/or high quality) while turning left toward point of interest 712, but may not configure the provider computing devices in vehicles 718 or 722 to aggressively capture street-level image data while approaching point of interest 712.

Figure 8:
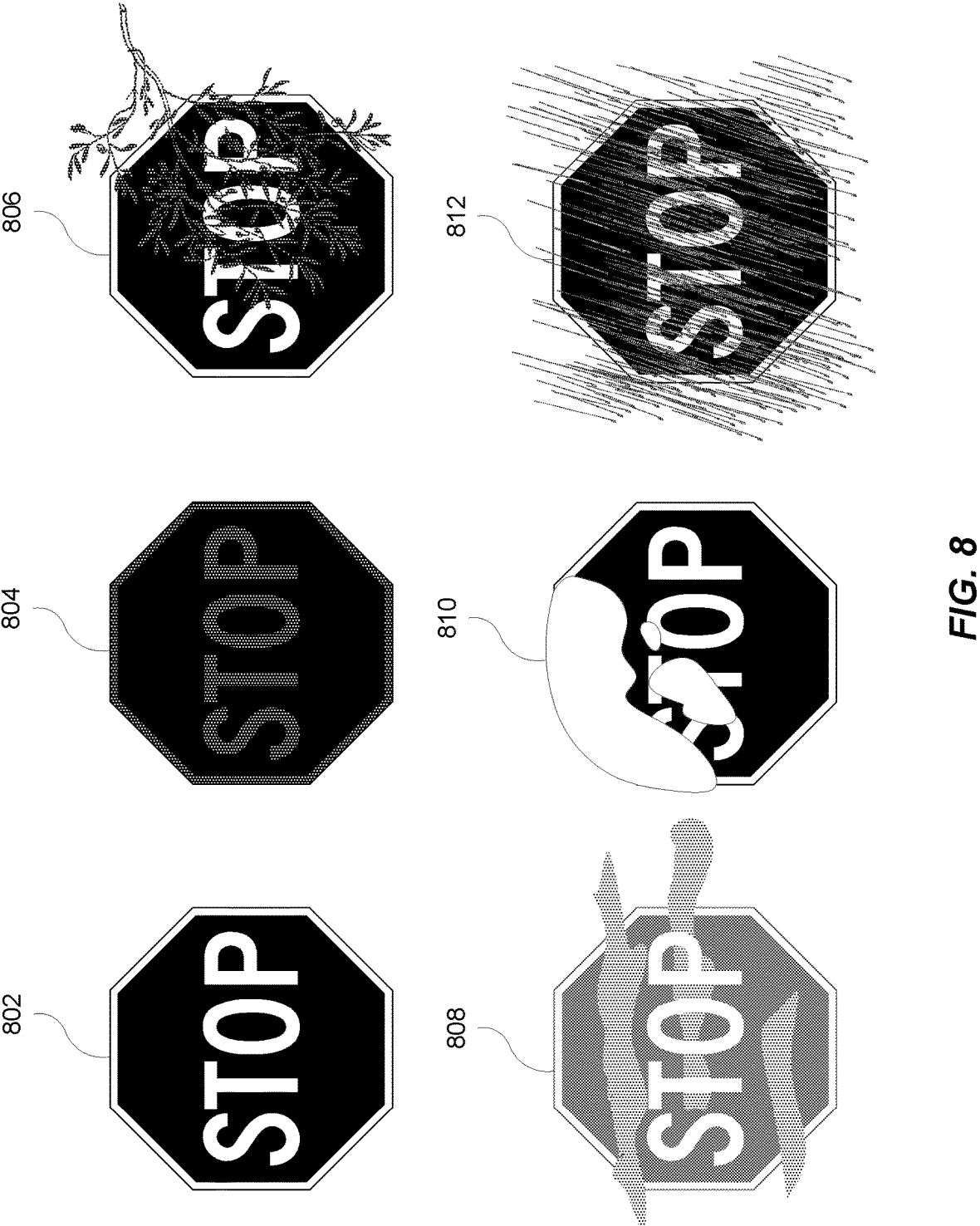
FIG. 8 is an illustration of exemplary images taken under varying conditions.

According to some examples, mobile device 230 may collect images based at least in part on external conditions (e.g., the time of day, the time of year, weather conditions, etc.). For example, server computer system 210 may coordinate the collection of street-level images under diverse conditions. Accordingly, mobile device 230 may collect images more aggressively in less common conditions. FIG. 8 provides an example of images of a stop sign in varying conditions. As shown in FIG. 8, the stop sign may appear differently in full daylight (802), in the evening (804), in windy weather (806), in fog (808), in snow (810), and in rain (812). However, server computer system 210 may have few or no images of the stop sign in the fog or the snow. Accordingly, server computer system 210 may, based on weather information indicating fog, instruct mobile device 230 to capture images of the stop sign. Additionally or alternatively, server computer system 210 may instruct mobile device 230 to capture images more aggressively in general during the fog. Alternatively, in some examples server computer system 210 and/or mobile device 230 may determine that an external condition precludes effective gathering of relevant street-level image data. For example, server computer system 210 and/or mobile device 230 may determine that when heavy fog is present it is too difficult to obtain relevant information from such images and thus, may instruct the mobile device 230 to stop capturing or to limit the rate of capturing of images during the heavy fog in order to conserve resources of mobile device 230.

In some examples, one or more of the systems described herein may alter transportation matching decisions and/or navigation instructions based on collected street-level image data. For example, server computer system 210 may receive image data indicating a road closure and/or an incident and may account for the image data when optimizing transportation matching decisions across a number of vehicles.

Figure 9:
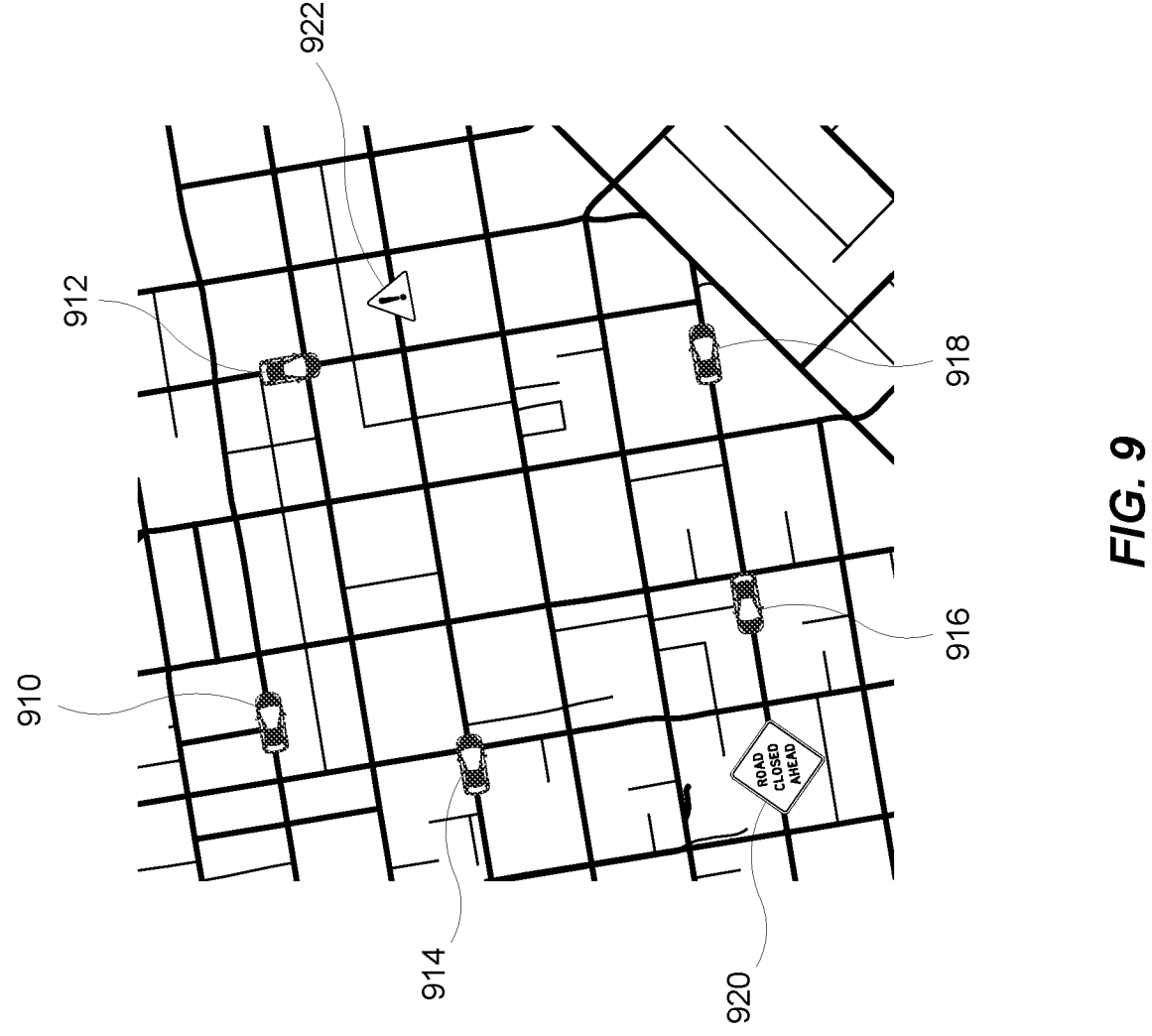
FIG. 9 is an illustration of an exemplary scenario of transportation matching based on street-level image collection.

As an example, FIG. 9 illustrates vehicles 910, 912, 914, 916, and 918 in a city area. As shown in FIG. 9, vehicle 912 may closely approach an incident 922 (e.g., a site of a collision). Accordingly, vehicle 912 may capture and upload image data of incident 922 to a server computer system. The server computer system may then determine that vehicle 910 is better suited for a match to a ride requestor at a location beyond incident 922 than is vehicle 912. Accordingly, vehicle 910 may receive the match instructions. In another example, a vehicle 916 may approach and capture image data of a road closure 920. However, vehicle 918 may already be navigating to a location beyond road closure 920. Accordingly, server computer system may provide new navigation instructions for vehicle 918 and send an updated estimated time of arrival to a waiting requestor. In some examples, as the server computer system sends instructions that reroute one or more vehicles based on observed adverse conditions, the server computer system may route the vehicles close enough to the adverse conditions to collect more image data without routing the vehicles so close as to cause a delay.

Figure 10:
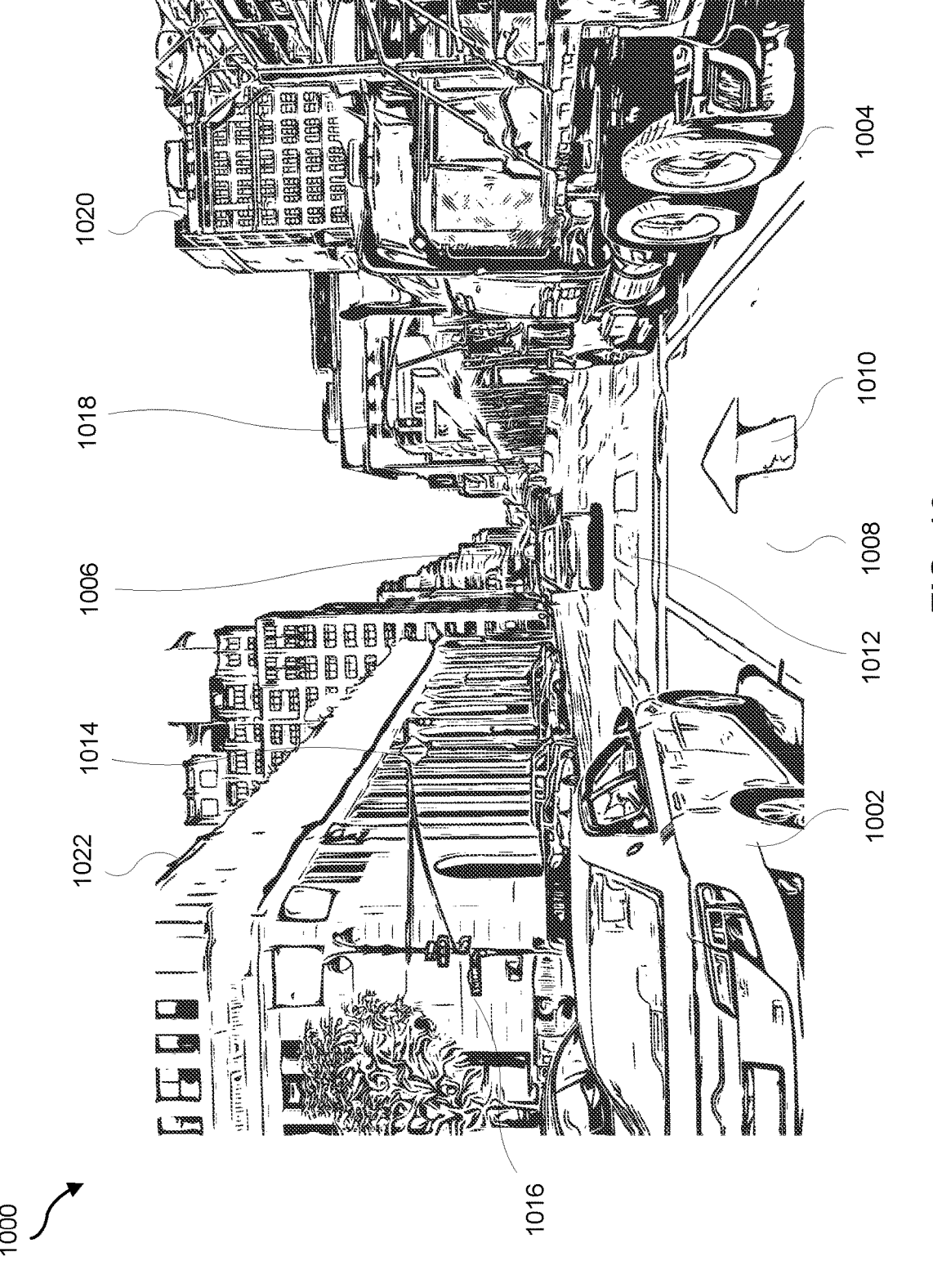
FIG. 10 is an illustration of an exemplary street-level image.

FIG. 10 illustrates an example street-level image 1000. As shown in FIG. 10, street-level image 1000 may include various elements of a street environment. For example, street-level image 1000 may include vehicles 1002, 1004, and 1006. In addition, street-level image 1000 may include a lane 1008, a pavement marking 1010, and a crosswalk 1012. Furthermore, street-level image 1000 may include a traffic sign 1014, a street sign 1016, and a traffic signal 1018. In addition, street-level image 100 may include buildings 1020 and 1022.

In one example, a provider computing device mounted within a vehicle may capture street-level image 1000. As discussed above, in various examples the provider computing device may upload street-level image 1000 to a server computer system. In some examples, the provider computing device may first preprocess street-level image 1000. For example, the provider computing device may extract one or more features from street-level image 1000. The provider computing device may extract any of a variety of features from street-level image 1000. For example, the provider computing device may extract street marking features (e.g., lane 1008, pavement marking 1010, and crosswalk 1012), vehicles (e.g., vehicles 1002, 1004, and 1006), pedestrians, signs (e.g., traffic sign 1014 and street sign 1016), signals (e.g., traffic signal 1018), curb markings, and/or buildings (e.g., buildings 1020 and 1022). In some examples, the provider computing device may upload the extracted features along with street-level image 1000. In some examples, the provider computing device may upload the extracted features alone (in the form of labels and/or in the form of image portions) rather than, e.g., uploading street-level image 1000. In certain examples, after uploading the extracted features to the server computer system, the server computer system may determine, based on the extracted features, whether to instruct the provider computing device to upload street-level image 1000. Additionally or alternatively, the server computer system may determine, based on the extracted features, a configuration for the provider computing device (and/or one or more additional provider computing devices associated with different vehicles) to collect additional street-level images (e.g., relating to one or more of the extracted features). For example, the server computer system may determine that pavement marking 1010 is not represented on a map (e.g., that pavement marking 1010 appears to be new) and may therefore request that the provider computing device upload street-level image 1000 and/or that the provider computing device and/or one or more additional provider computing devices collect additional street-level images of pavement marking 1010 and/or the surrounding street area.

In some examples, the provider computing device may use one or more of the extracted features for localization purposes. For example, the provider computing device may be in an area with a poor GPS signal. Accordingly, the provider computing device may match extracted features (e.g., street sign 1016 and/or buildings 1020 and 1022) to a map to more accurately and/or precisely determine the current location of the vehicle associated with the provider computing device.

FIG. 11 is a flow diagram of an exemplary computer-implemented method 1100 for collecting street-level image data. The steps shown in FIG. 11 may be performed by any suitable computer-executable code and/or computing system, including, for example, server computer system 210 and/or server computer modules 212 of FIG. 2. In one example, each of the steps shown in FIG. 11 may represent an algorithm whose structure includes and/or is represented by multiple sub-steps, examples of which will be provided in greater detail below.

As illustrated in FIG. 11, at step 1110 one or more of the systems described herein may identify a provider computing device for use in capturing street-level image data, where the provider computing device is associated with a vehicle and controls a camera positioned to capture street-level imagery outside the vehicle. For example, server computer system 210 may be in communication with computing devices associated with each of vehicles 220. As a specific example, server computer system 210 may identify mobile device 230 associated with vehicle 222, where camera 236 is positioned to view street-level imagery outside vehicle 222.

The server computer system may identify the provider computing devices in the vehicles in any suitable manner. For example, server computer system 210 may identify mobile device 230 by receiving a communication from one or more of image collection modules 234 (e.g., identifying mobile device 230 to server computer system 210 as an image collection device). Additionally or alternatively, server computer system 210 may identify mobile device 230 by receiving a communication from driver app 232. Accordingly, in some examples, server computer system 210 may identify target vehicles for image collection by identifying mobile devices that have registered with server computer system 210 via a transportation matching application and/or an associated application. In some examples, driver app 232 may include an option to enable street-level image collection, and server computer system 210 may determine that street-level image collection is enabled for mobile device 230.

In some examples, one or more of the systems described herein may determine that a mobile device is suitable for street-level image collection. For example, some mobile devices may have insufficient storage, processing, and/or networking resources available for a desired standard of street-level image collection. Additionally or alternatively, some mobile devices may have insufficient resources to reliably execute a transportation matching application while also collecting street-level image data. Accordingly, in some examples, server computer system 210 may determine whether mobile device 230 is on a whitelist of mobile device models to determine whether to include mobile device 230 in street-level image collection.

In some examples, server computer system 210 may include devices by default, and instead determine whether mobile device 230 is on a blacklist of mobile device models. For example, server computer system 210 may consult a whitelist of devices (listing, e.g., model numbers and/or serial numbers of devices determined to have sufficient capability to collect images to a determined standard of quality without an undue adverse impact on device performance) or a blacklist of devices (listing, e.g., model numbers and/or serial numbers of devices determined to have insufficient capability to collect images to a determined standard of quality without an undue adverse impact on device performance). Additionally or alternatively, server computer system 210 may identify attributes of mobile device 230 including, without limitation, storage capacity, network capacity, application performance information (e.g., transportation matching application performance information, including information indicating non-reliability, low responsiveness, etc.), camera resolution and/or quality, etc. For example, server computer system 210 may determine that the battery level of mobile device 230 is below a threshold (e.g., below 20%) and, in response, determine that mobile device 230 is not currently suitable for street-level image collection. As another example, server computer system 210 may determine that storage space available to mobile device 230 is below a threshold (e.g., below 5 gigabytes) and, in response, determine that mobile device 230 is not currently suitable for street-level image collection. In an additional example, server computer system 210 may determine that that a performance metric for driver app 232 (e.g., a transportation matching application) fails to meet a critical threshold (e.g., that reaction time to user input and/or new data has exceeded 800 milliseconds) and, in response, determine that mobile device 230 is not currently suitable for street-level image collection. By ensuring that mobile device 230 has sufficient resources to reliably perform street-level image collection (while, e.g., performing other tasks, such as transportation matching tasks), the systems described herein may leverage the capabilities of mobile device 230 without interfering with other uses of mobile device 230.

According to some examples, as a part of identifying mobile device 230, server computer system 210 may determine that vehicle 222 is driving and/or engaged in activities related to transportation matching before initiating street-level image collection for mobile device 230. For example, server computer system 210 may determine that driver app 232 is open and/or active. Additionally or alternatively, server computer system 210 may determine that driver app 232 indicates that driver app 232 in engaged in a requested ride, pick-up interaction, is traveling, is waiting for a ride request, and/or is performing a drop-off activity. In some examples, server computer system 210 may determine that driver app 232 is set to an online mode (e.g., a setting enabled by a provider that indicates that the provider is currently available to fulfill ride requests) rather than an offline mode (e.g., indicating that the provider is currently unavailable to fulfill ride requests). In some examples, server computer system 210 may determine, based on sensor data from mobile device 230 (e.g., accelerometer information), that vehicle 222 is traveling. In some examples, server computer system 210 may also determine, based on sensor data from mobile device 230, particular attributes associated with the traveling vehicle (e.g., speed, bearing, acceleration, angle/slope of travel, height above sea level, etc.).

At step 1120, one or more of the systems described herein may determine a configuration that controls use of the provider computing device to provide street-level imagery captured from a vantage point afforded to the camera by the vehicle to a server computer system. For example, server computer system 210 may determine a configuration that controls the use of mobile device 230 to provide street-level imagery captured from a vantage point afforded by vehicle 222 to server computer system 210. The configuration may include any of a variety of data, including, e.g., geolocation information specifying where to collect street-level image data (and, e.g., at what frequency and/or with what quality at the specified locations), with what frequency to collect street-level image data, with what quality to collect street-level image data, and/or under what conditions to collect (or stop collecting) street-level image data. In various examples, server computer system 210 may determine the configuration based at least in part on information received from the provider computing device and/or from one or more additional provider computing devices within the plurality of provider computing devices. For example, as will be discussed in greater detail below, server computer system 210 determine the configuration based at least in part on the capabilities of the provider computing device, the capabilities of one or more additional provider computing devices, on image data that has previously been collected by the provider computing device and/or additional provider computing devices, on the current and/or projected locations of the provider computing device and/or additional provider computing devices. In some examples, as will be explained in greater detail below, server computer system 210 may aggregate information received from the provider computing device and/or additional provider computing devices to coordinate street-level image data collection across the provider computing devices.

Server computer system 210 may control the use of mobile device 230 for any of a variety of purposes. For example, server computer system 210 may control the use of mobile device 230 to control and/or influence the quality, quantity, and/or selection of image data provided by mobile device 230 to server computer system 210. For example, server computer system 210 may control the use of mobile device 230 to provide a greater quantity of image data for areas where recent image data is sparse and/or for locations where images of interest have been observed and/or predicted (e.g., images showing changes to street features and/or conditions, showing unusual events and/or conditions, etc.). Likewise, server computer system 210 may control the use of mobile device 230 to provide a higher quality of image data (e.g., images at a higher resolution, full images instead of partial images or isolated image features, etc.) where recent high-quality image data is sparse and/or for locations where images of interest have been observed and/or predicted.

Additionally or alternatively, server computer system 210 may control the use of mobile device 230 to limit the use of resources by mobile device 230 for the image data collection and/or to protect the performance of a provider application (e.g., a transportation matching application) during image data collection.

Street-level imagery collection may be a resource-intensive process in multiple respects. For example, mobile devices may have limited storage capacity which may be quickly consumed by storing—or even temporarily caching—a constant stream of images. While uploading image data shortly after images are captured may allow a mobile device to reclaim storage used for the uploaded images, network and other resources involved in transmitting image data may also be limited. In addition, both image capturing and uploading may involve limited input/output resources, while limited processing resources may be consumed by image capturing, uploading, and any analysis and/or pre-processing that the mobile device may perform on captured images before uploading image data. Accordingly, in some examples, server computer system 210 may determine a configuration that limits the circumstances under which mobile device 230 will capture an image and/or will continue to store an image that has yet to be processed and/or uploaded. Likewise, in some examples server computer system 210 may determine a configuration that limits the circumstances under which mobile device 230 will upload image data (including, e.g., uploading an image) that has already been captured. Thus, the various examples provided herein of configurations that determine the circumstances under which mobile device 230 will perform a resource-intensive activity such as (i) capturing an image, (ii) storing (including continuing to store) an image, or (iii) uploading image data may generally be understood as also providing examples of circumstances under which one of the unstated resource-intensive activities may be performed.

In some examples, server computer system 210 may determine the configuration in response to first receiving information from mobile device 230. In one example, mobile device 230 may provide, to a configuration component of server computer modules 212, data identifying mobile device 230 and the current geolocation of vehicle 222 (e.g., based on the current geolocation of mobile device 230). In some examples, server computer system 210 may also receive and/or have previously received information about mobile device 230 (e.g., the model of mobile device 230 and/or device specifications). Continuing with the above example, in response to mobile device 230 providing the information to the configuration component of server computer modules 212, server computer modules 212 may return configuration values to mobile device 230. For example, the configuration values may include an indication of whether to capture imagery for the provided geolocation, the intervals at which mobile device 230 is to capture images (e.g., the number of times per second mobile device 230 is to capture images), the number of frames per interval that mobile device 230 is to capture (e.g., such that an interval setting of 2 per second and a frames per capture setting of 3 results in capturing 6 frames per second), the resolution at which the images are to be captured, an indication of whether and/or how much cellular data mobile device 230 is to use uploading captured images, a maximum number of images to capture per day, and/or a maximum number of captured images to store at any given time.

As may be appreciated, in some examples, server computer system 210 may provide configuration instructions that are dependent on information held by mobile device 230, whereas in some examples, mobile device 230 may provide information and server computer system 210 may then provide configuration instructions based on the information. For example, server computer system 210 may provide, as part of the configuration, geolocation data that specifies where mobile device 230 is to capture images, and mobile device 230 may then capture images when at a geolocation that matches the geolocation data. In other examples, mobile device 230 may provide a current geolocation and server computer system 210 may then determine whether mobile device 230 is to capture images.

In some examples, server computer system 210 may determine the configuration for mobile device 230 based at least in part on one or more additional computing devices within one or more of vehicles 220. For example, server computer system 210 may identify a collection objective for street-level image data based on one or more data collection rules. Data collection rules may specify any of a variety of criteria for collecting street-level image data, including, without limitation, collecting image data at specified geolocations, collecting image data under specified conditions (e.g., during specified times of day, under specified weather conditions, with or without transient elements such as vehicles and/or pedestrians, etc.), collecting image data from specified angles, collecting image data with specified camera settings and/or quality levels (e.g., image resolution), collecting image data of specified subjects (e.g., particular signs, buildings, lane markings, etc.), and any combination of the foregoing. As an example, server computer system 210 may identify an objective to collect a specified number of images at a specified geolocation. Server computer system 210 may then determine that a set of provider computing devices associated with one or more of vehicles 220 match the data collection rule. Having determined the set of provider computing devices that match the data collection rule, server computer system 210 may determine an individual configuration for each of the set of provider computing devices such that the set of provider computing devices are collectively configured to meet the collection objective. In one example, server computer system 210 may identify a collection objective to collect street-level image data for a street on a periodic basis and/or a rolling-window basis. For example, the collection objective may specify a weekly update of street-level image data for the street (e.g., specifying that image data that includes street information, markings, and/or signage be collected each week). As another example, the collection objective may specify a fifteen-minute rolling window of street-level image data for the street (e.g., specifying that image data that includes transient street conditions, such as traffic, be collected within fifteen minutes of the most recent image data collected from the street). In another example, server computer system 210 may identify a collection objective to collect a large amount of street-level image data for a frequently traveled street. Accordingly, server computer system 210 may individually configure several separate provider computing devices to each collect a portion of the street-level image data for the street (based on, e.g., capacity information for each of the selected provider computing devices to ensure that the performance of the selected provider computing devices is not adversely affected and/or to ensure that the selected provider computing devices have sufficient battery, storage, network, and/or other resources to capture, store, and/or upload street-level image data for other streets).

In some examples, server computer system 210 may use location information describing the location of one or more provider computing devices to determine which provider computing devices are best suited to collect street-level image data at a target location. Additionally or alternatively, server computer system 210 may use projected route information describing the predicted locations of one or more provider computing devices to determine which provider computing devices are best suited to collect street-level image data at a target location. Server computer system 210 may determine the projected route of a provider computing device in any of a variety of ways. For example, server computer system 210 may determine the projected route of a provider computing device by receiving, from a navigation subsystem on the provider computing device, a route currently recommended to the provider. Additionally or alternatively, server computer system 210 may determine the projected route of a provider computing device by determining a location to which a provider has been assigned to travel (e.g., to pick up and/or drop off a ride requestor). In some examples, server computer system 210 may determine the projected route of a provider computing device based on historical route data.

Server computer system 210 may determine the individual configurations for each of the set of provider computing devices in any of a variety of ways. In some examples, server computer system 210 may receive capability data from the respective computing devices in vehicles 220 (including mobile device 230 in vehicle 222). Server computer system 210 may then optimize the individual configuration for each of the set of provider computing devices based on the capability data received from the various provider computing devices associated with vehicles 220. For example, as will be described in greater detail below, server computer system 210 may optimize the individual configuration for each provider computing device by configuring each provider computing device according to the capabilities of each provider computing device. In some examples, server computer system 210 may identify image data collection tasks that can only be performed by select provider computing devices and/or that can be performed more efficiently (e.g., using fewer aggregate computing resources across provider computing devices), more effectively (e.g., with a higher probability of success and/or with a higher quality result) by select provider computing devices. Accordingly, server computer system 210 may first assign such image collection tasks to the select provider computing devices (by, e.g., configuring the select provider computing devices to perform the identified image collection tasks). In some examples, server computer system 210 may translate an image data collection objective into a constrained optimization problem by, e.g., specifying the image collection objective in terms of an objective function and specifying the capabilities of each provider computing device (discussed further below) as a constraint to the objective function. Server computer system 210 may then solve the constrained optimization problem using any suitable approach, including, without limitation, a simplex algorithm, a branch and bound algorithm, and/or a first-choice bounding function.

The capability data may include any of a variety of information. In some examples, the capability data may pertain to computing capabilities of the various computing devices. For example, a device with greater storage capacity, a superior network connection, and/or processing power capable of supporting an aggressive rate of image collection (without, e.g., disrupting a driver application operating on the same device) may be assigned a greater rate and/or greater total number for image collection.

In some examples, the capability data may pertain to the disparate contexts in which the various mobile devices and/or their corresponding vehicles are found at any given time. For example, the capability data may describe the views available to the cameras of provider computing devices associated with one or more of vehicles 220. For example, the capability data provided by the provider computing device may describe a geolocation of the provider computing device, a bearing of the provider computing device, an altitude of the provider computing device, an orientation of the provider computing device, lighting available to the camera of the provider computing device, and/or information describing street-level visibility available to the camera of the provider computing device (e.g., information indicating a percentage of a street-level view outside the vehicle that is visible to the camera and/or information indicating which portions of a street-level view outside the vehicle are obscured from the camera). Accordingly, a provider computing device with a superior vantage point for capturing a particular set of images may be assigned a greater responsibility for collecting those images.

In some examples, the capability data may specify the imaging capabilities of a provider computing device. For example, the capability data may include camera specifications (e.g., camera resolution, megapixel count, camera sensor size, camera sensor photodetector size, camera sensor type, camera focal length, camera aperture, and/or image stabilization features). Additionally or alternatively, server computer system 210 may determine the imaging capabilities of the provider computing device based on the quality of past image data provided by the provider computing device to server computer system 210. In some examples, server computer system 210 may determine the quality of past image data provided by the provider computing device under varying conditions (e.g., varying lighting conditions, at varying travel speeds, at varying distances, etc.). In these examples, server computer system 210 may configure provider computing devices to capture images under conditions best suited to the individual provider computing devices. For example, server computer system 210 may determine that two provider computing devices will pass by a target image collection location, but that one provider computing device is better equipped for low light image capture while the other provider computing device is better equipped for high light image capture. Accordingly, server computer system 210 may determine current light conditions (e.g., based on the time of day in combination with historical image capture data at the target location) and configure the provider computing device that is better suited for the image capture given the conditions to capture the image data at the target location instead of configuring the provider computing device that is less well suited for the image capture to capture the image data at the target location.

In addition to schemes for distributing image collection tasks among provider computing devices, server computer system 210 may use information from a provider computing device in one vehicle to identify points of high interest for image collection by provider computing devices in other vehicles. For example, mobile device 230 in vehicle 222 may observe an accident or a new street sign. Server computer system 210 may receive street-level image data from vehicle 222 indicating the accident or new street sign (including, e.g., a location at which the street-level image data was collected). Server computer system 210 may identify the accident or new street sign as a target for further image data collection. Accordingly, server computer system 210 may, upon determining the location of the accident or new street sign, instruct other provider computing devices within one or more of vehicles 220 to collect images of the location of interest. Additionally or alternatively, server computer system 210 may instruct the other provider computing devices to collect images of the location of interest more aggressively (e.g., at a higher rate) and/or at a higher resolution.

Not only may server computer system 210 use street-level image data collected from the provider computing devices of other vehicles to determine the configuration for mobile device 230, server computer system 210 may use street-level image data collected from mobile device 230 to determine the configuration for vehicle 222. For example, vehicle 222 may transmit street-level image data of interest to server computer system 210. Server computer system 210 may determine that the street-level image data is of interest and immediately push a revised configuration to mobile device 230 to collect images more aggressively (e.g., while the point of interest is still in view of mobile device 230). Additionally or alternatively, server computer system 210 may push a revised configuration instructing mobile device 230 to upload related street-level image data that would otherwise have been discarded (e.g., mobile device 230 may sometimes capture images at a greater rate than they are uploaded, because, e.g., uploading may pose a more significant bottleneck; accordingly, mobile device 230 may routinely discard some captured images).

Server computer system 210 may determine the configuration in any suitable context. For example, server computer system 210 may determine the configuration whenever requested by mobile device 230. In some examples, mobile device 230 may request the configuration at a regular interval (e.g., once every minute). Additionally or alternatively, mobile device 230 may request the configuration when entering a new region for which mobile device 230 lacks recent configuration information. In some examples, as will be described in greater detail below, server computer system 210 may determine the configuration in response to receiving new information which would impact the configuration.

At step 1130, one or more of the systems described herein may send the configuration to the provider computing device. For example, server computer system 210 may send the configuration to mobile device 230.

Server computer system 210 may send the configuration to mobile device 230 in any suitable context. For example, server computer system 210 may push the configuration to mobile device 230 when a revised configuration is determined. Additionally or alternatively, server computer system 210 may send the configuration to mobile device 230 when mobile device 230 connects to server computer system 210 to request new configuration data, to upload street-level image data to server computer system 210, and/or in the course of executing driver app 232.

At step 1140, one or more of the systems described herein may receive, from the provider computing device, street-level image data captured by the provider computing device using the camera responsive to the configuration. For example, server computer system 210 may receive, from mobile device 230, street-level image data captured by mobile device 230 using camera 236, responsive to the configuration received from server computer system 210.

The systems and methods described herein may use street-level image data uploaded by computing devices in a group of vehicles in any of a variety of ways. In some examples, a mapping system may update map data based on changes and/or discrepancies observed from the street-level image data. For example, if a road sign is captured that shows a street has changed from two-way to one-way, the mapping system may direct the transportation matching system to obtain a certain number of images of the new sign and once a threshold number of such images are confirmed through some of the processes discussed herein, may update the map to include the new sign. Similar processes may be accomplished for any sign changes, painted lane changes, street name changes, and/or any other meaningful changes to the conditions and/or operation of a street as observed through street-level imagery. Additionally or alternatively, the mapping system may enhance map data with short-term, temporary, and/or transient data about temporary changes such as construction, road closures, accidents, crowds, parades, and any other information that may be relevant to mapping and/or navigation.

While, in some examples, systems described herein may update a map based on a change indicated by street-level image data collected by a single provider computing system, in some examples systems described herein may delay committing and/or pushing a change to a map until after a number of additional provider computing systems have collected corresponding street-level image data of the change. For example, server computer system 210 may receive street-level image data from mobile device 230 indicating information not currently reflected on a map. In response to receiving the street-level image data and identifying a potential change and/or update to the map, server computer system 210 may configure one or more additional provider computing devices to collect street-level image data at the location of the potential change or update (e.g., in order to confirm the change or update). Once server computer system 210 has received corroborating street-level image data from the additional provider computing devices to a certain threshold, server computer system 210 may update the map. In some examples, server computer system 210 may then provide the map update to one or more provider computing devices.

In some examples, a transportation matching platform may benefit from improved mapping data by improving arrival time estimates for providers (and reducing cancellations caused by incorrect estimates). Additionally or alternatively, matching decisions by a transportation matching platform may improve with more accurate map data.

In some examples, one or more of the systems described herein may use street-level image data to help a requestor meet a matched provider. For example, the requestor's transportation matching application may display real-time image data captured by the provider's mobile device to allow the requestor to see the provider's approach from the provider's perspective. Thus, the requestor may find the provider more easily and/or may be able to follow the provider's progress toward the requestor in greater detail. For example, the server computer system may match the provider with the requestor. The server computer system may then send a configuration to the provider that causes the provider computing device to capture street-level image data as the provider approaches the requestor. In some examples, the configuration may cause the provider computing device to capture street-level According to some examples, one or more of the systems described herein may preserve images related to collisions (e.g., to document the collision for, e.g., insurance purposes). For example, a provider computing device may capture street-level images of a collision (e.g., at or near the time of the collision), of vehicles and/or pedestrians involved in the collision (e.g., before, after, or during the collision). The provider computing device may then preserve, store, and/or upload street-level image data relating to the collision to the server computer system based at least in part on the street-level image data include information about the collision. In some examples, the provider computing device may determine that the street-level image data indicates a collision (e.g., based on the content of the captured images, based on sensor data from the provider computing device that indicates an abrupt stop by the provider computing device, and/or based on an incident report received by the provider computing device that indicates that the location of the street-level images matches the location of a collision). Additionally or alternatively, the server computer system may determine that the provider computing device is approaching, is at, and/or has passed the location of the collision and may configure the provider computing device to capture, preserve, and/or upload the street-level images captured by the provider computing device at and/or near the location of the collision.

Once the server computer system receives the street-level image data from the provider computing device, the server computer system may analyze the street-level image data and, based on the analysis, define a collection objective to collect additional street-level image data that is related to the street-level image data. For example, the street-level image data may include unexpected information, new information, and/or information of particular relevance as defined by a collection criterion of the server computer system. Accordingly, the server computer system may update the configuration, based on the street-level image data received by the server computer system, to cause the provider computing device to provide additional street-level image data related to the street-level image data. The server computer system may subsequently receive the additional street-level image data from the provider computing device. For example, the provider computing device may capture an image of a parade not previously known about or anticipated by the server computer system. Upon receiving street-level image data indicating the existence of the parade, the server computer system may configure the provider computing device to collect street-level image data at a higher rate while in proximity of the location of the first street-level image(s) relating to the parade and/or while a threshold number of pedestrians continue to be in view of the provider computing device.

FIG. 12 is a flow diagram of an exemplary computer-implemented method 1200 for collecting street-level image data. As mentioned above, in some examples a server computer system (e.g., server computer system 210) may perform one or more of the steps illustrated in FIG. 11. Likewise, the steps shown in FIG. 12 may be performed by any suitable computer-executable code and/or computing system, including, for example, mobile device 230 and/or image collection modules 234 of FIG. 2. In one example, each of the steps shown in FIG. 12 may represent an algorithm whose structure includes and/or is represented by multiple sub-steps, examples of which will be provided in greater detail below.

As illustrated in FIG. 12, at step 1210 one or more of the systems described herein may connect, from a computing device associated with a vehicle, to a server computer system that coordinates image data collection across a group of vehicles, where the provider computing device controls a camera positioned to view street-level imagery outside of the vehicle. For example, mobile device 230 associated with vehicle 222 may connect to server computer system 210 that coordinates image data collection across vehicles 220. In one example, mobile device 230 may control camera 236 positioned to view street-level imagery outside vehicle 222.

Mobile device 230 may connect to server computer system 210 in any suitable context. For example, mobile device 230 may connect to server computer system 210 when driver app 232 and/or when image collection modules 234 are installed on mobile device 230. Additionally or alternatively, mobile device 230 may connect to server computer system 210 when mobile device 230 detects vehicle 222 (e.g., when mobile device 230 establishes a communicative connection with vehicle 222 and/or detects a communication device pertaining to vehicle 222, such as a BLUETOOTH device). In some examples, mobile device 230 may connect to server computer system 210 when an image collection option is enabled to mobile device 230.

At step 1220, one or more of the systems described herein may receive, by the provider computing device and from the server computer system, a configuration that controls use of the provider computing device to provide street-level image data captured by the camera to the server computer system. For example, mobile device 230 may receive, from server computer system 210, a configuration that controls the use of mobile device 230 to provide street-level image data captured by camera 236 to server computer system 210.

Once mobile device 230 receives the configuration, mobile device 230 may implement the configuration as specified. As mentioned earlier, in some examples the configuration may include conditional configuration rules that depend on information available to mobile device 230. Accordingly, mobile device 230 may first determine, based on device state and/or sensor information, which aspects of the configuration currently apply to mobile device 230.

At step 1230, one or more of the systems described herein may determine, based on sensor data accessed by the provider computing device and responsive to the configuration, that a condition is met to use the provider computing device to provide street-level image data from a street-level image viewed by the camera to the server computer system. For example, mobile device 230 may determine, based on data from sensors 238 and responsive to the configuration, that a condition is met to use mobile device 230 to provide street-level image data from a street-level image viewed by camera 236 to server computer system 210.

As mentioned above, determining that a condition is met to use the provider computing device to provide street-level image data to the server computer system may refer to the use of any of a variety of resources, especially considering that providing street-level image data may involve capturing images, storing images, processing images, and/or upload-ing image data. For example, mobile device 230 may determine that a condition is met to capture a street-level image with camera 236. Additionally or alternatively, mobile device 230 may determine that a condition is met to continue to store (rather than, e.g., to discard) a previously captured street-level image. In some examples, mobile device 230 may determine that a condition is met to upload the street-level image data server computer system 210.

Mobile device 230 may use any of a variety of data from sensors 238 to determine whether the condition is met to use the provider computing device to provide the street-level image data. For example, mobile device 230 may use data from an accelerometer, a gyroscope, a gravity sensor, a rotational vector sensor, a global positioning system (GPS), a magnetometer, an orientation sensor, a barometer, a light sensor, a wireless radio adapter (e.g., for wireless local area networking such as a WI-FI adapter, for short-distance data exchange such as a BLUETOOTH adapter, for long distance communication such as a cellular network card, etc.), a microphone, an air temperature sensor, and/or a humidity sensor. Generally, mobile device 230 may use data from any sensor with which mobile device 230 may be equipped. In some examples, mobile device 230 may use direct and/or instantaneous sensor data to determine whether the condi-tion is met (e.g., using the accelerometer to determine detect acceleration of vehicle 222). Additionally or alternatively, mobile device 230 may use indirect, contextualized, and/or combined sensor data to determine whether the condition is met (e.g., using data from the accelerometer and GPS over time to estimate the speed of vehicle 222).

In some examples, mobile device 230 may use geoloca-tion data to determine whether the condition is met. For example, mobile device 230 may collect street-level images based on the geolocation of mobile device 230 (and, thus, vehicle 222) falling within a specified geofence.

In some examples, mobile device 230 may collect images based on camera sensor data (e.g., determining that the content of the camera sensor data is of interest and/or determining that the content of an image already captured and temporarily stored is of interest). For example, mobile device 230 may detect a street sign (e.g., a stop sign, a speed limit sign, a one-way street sign, a left-turn only sign, a parking sign, a no-stopping or no-loading sign, etc.), a traffic signal, a painted curb (e.g., indicating a no-stopping area), a lane marking, a bus-only marker and/or sign, a bike-lane marker and/or sign, a street number, a street address, a landmark, a building, a park, a door, construction activity, another vehicle, a brand identifier connected to a vehicle of a ride provider, or a storefront sign. In some examples, mobile device 230 may collect the image based in part on the identified content. Additionally or alternatively, mobile device 230 may collect the image based at least in part on a determination (e.g., by mobile device 230 and/or by server computer system 210) that the image does not match map data accessible to mobile device 230. For example, a map accessible to mobile device 230 (e.g., a map used by driver app 232) may indicate that a street is a two-way street but mobile device 230 may observe a one-way street sign. In another example, the map may indicate that a street is one-way only (northbound) but mobile device 230 may observe a sign indicating that the street is one-way only (southbound). As another example, the map may indicate the presence of a one-way street sign, but mobile device 230 may observe the absence of a one-way street sign at the expected location. Accordingly, mobile device 230 may collect images based at least in part on the discrepancy.

In one example, mobile device 230 may collect images based on an unpredicted event involving the vehicle. For example, mobile device 230 may collect images based on determining that the vehicle has been involved in an incident (e.g., a collision). In some examples, mobile device 230 may collect images based on detecting an abrupt stop. Addition-ally or alternatively, mobile device 230 may collect images based on detecting a detour from an expected travel path (e.g., a detour from navigation instructions provided via mobile device 230 and/or a route that is inconsistent with one or more predicted routes for arriving at a set destina-tion).

As discussed earlier, in various examples, mobile device 230 may collect street-level images at a specified frequency. In addition, in some examples, mobile device 230 may temporarily suspend the collection of images. For example, mobile device 230 may temporarily suspend the collection of images when stopped. In some examples, mobile device 230 may temporarily suspend the collection of images based on location data indicating that the mobile device 230 is at an intersection (e.g., with a stop sign or stop light). Addi-tionally or alternatively, mobile device 230 may temporarily suspend the collection of images based on sensor data indicating that the speed with which mobile device 230 is traveling has fallen below a threshold (e.g., is substantially stopped). As another example, mobile device 230 may temporarily suspend the collection of images based on camera data showing a stop sign and/or stop light. Although mobile device 230 may ordinarily suspend (or slow) the collection of images when stopped (e.g., at an intersection), in some examples mobile device 230 may nevertheless collect images responsive to sensor data and/or a commu-nication from the server computer system indicating that the camera is viewing or will view images of interest. For example, mobile device 230 may capture images of a vehicle of interest passing (e.g., an emergency vehicle) while stopped at an intersection. As another example, mobile device 230 may capture images of a collision while stopped at an intersection. In a further example, mobile device 230 may receive an instruction from the server computer system to capture images while stopped at an intersection (e.g., because the server computer system may predict a large number of pedestrians will soon exit a nearby arena due to the anticipated end of a major event).

At step 1240, one or more of the systems described herein may use a resource of the provider computing device to provide the street-level image data to the server computer system based on determining that the condition is met. For example, mobile device 230 may use its resources to provide the street-level image data to server computer system 210 based on determining that the condition is met.

As mentioned earlier, providing street-level image data may involve capturing images, storing images, processing images, and/or uploading image data. Accordingly, mobile device 230 may capture an image based on determining the condition is met, store (or continue to store) an image based on determining the condition is met, process an image (e.g., extract features from the image via a machine learning algorithm) based on determining the condition is met, and/or upload image data corresponding to the image based on determining the condition is met.

The street-level image data may include any data associated with and/or derived from the street-level image. For example, the street-level image data may include the image, features extracted from the image, a cropped version of the image, a reduced quality version of the image, and/or metadata describing the context in which the image was taken. The metadata may include any of a variety of data, including the geolocation at which the image was taken, a camera type that captured the image, camera settings used to take the image, specifications of the mobile device that captured the image, a direction the camera was facing when the image was taken, an altitude at which the image was taken, a resolution with which the image was taken, a time at which the image was taken, a speed at which the vehicle was traveling when the image was taken, and/or one or more triggering conditions that contributed to the image being captured and/or uploaded.

In some examples, the metadata may include the distance from the camera (and/or vehicle) of one or more objects in the image. For example, mobile device 230 may manually control the camera focus to measure the distance of objects (e.g., by determining at what setting the objects are brought into focus).

Mobile device 230 may upload the street-level image data in accordance with any of a variety of conditions (e.g., as specified in the configuration set by server computer system 210). For example, mobile device 230 may upload the street-level image data when a WI-FI connection is available (as opposed to, e.g., a cellular data connection). In some examples, mobile device 230 may upload the street-level image data when a battery level of the mobile device 230 exceeds a specified threshold (e.g., above 20%). Additionally or alternatively, mobile device 230 may upload the street-level image data when one or more processing, memory, and/or network resources of mobile device 230 have a specified level of available capacity (e.g., sufficient to avoid interference with one or more other applications operating on mobile device 230). In some examples, mobile device 230 may (e.g., in accordance with the configuration set by server computer system 210) alternate between capturing images and uploading images (e.g., to avoid the simultaneous consumption of resources involved in simultaneously capturing images and uploading images).

Embodiments of the instant disclosure may include or be implemented in conjunction with a dynamic transportation matching system. A transportation matching system may arrange rides on an on-demand and/or ad-hoc basis by, e.g., matching one or more ride requestors with one or more ride providers. For example, a transportation matching system may provide one or more transportation matching services for a ridesharing service, a ridesourcing service, a taxicab service, a car-booking service, an autonomous vehicle service, or some combination and/or derivative thereof. The transportation matching system may include and/or interface with any of a variety of subsystems that may implement, support, and/or improve a transportation matching service. For example, the transportation matching system may include a matching system (e.g., that matches requestors to ride opportunities and/or that arranges for requestors and/or providers to meet), a mapping system, a navigation system (e.g., to help a provider reach a requestor, to help a requestor reach a provider, and/or to help a provider reach a destination), a reputation system (e.g., to rate and/or gauge the trustworthiness of a requestor and/or a provider), a payment system, and/or an autonomous or semi-autonomous driving system. The transportation matching system may be implemented on various platforms, including a requestor-owned mobile device, a computing system installed in a vehicle, a requestor-owned mobile device, a server computer system, or any other hardware platform capable of providing transportation matching services to one or more requestors and/or providers.

Figure 13:
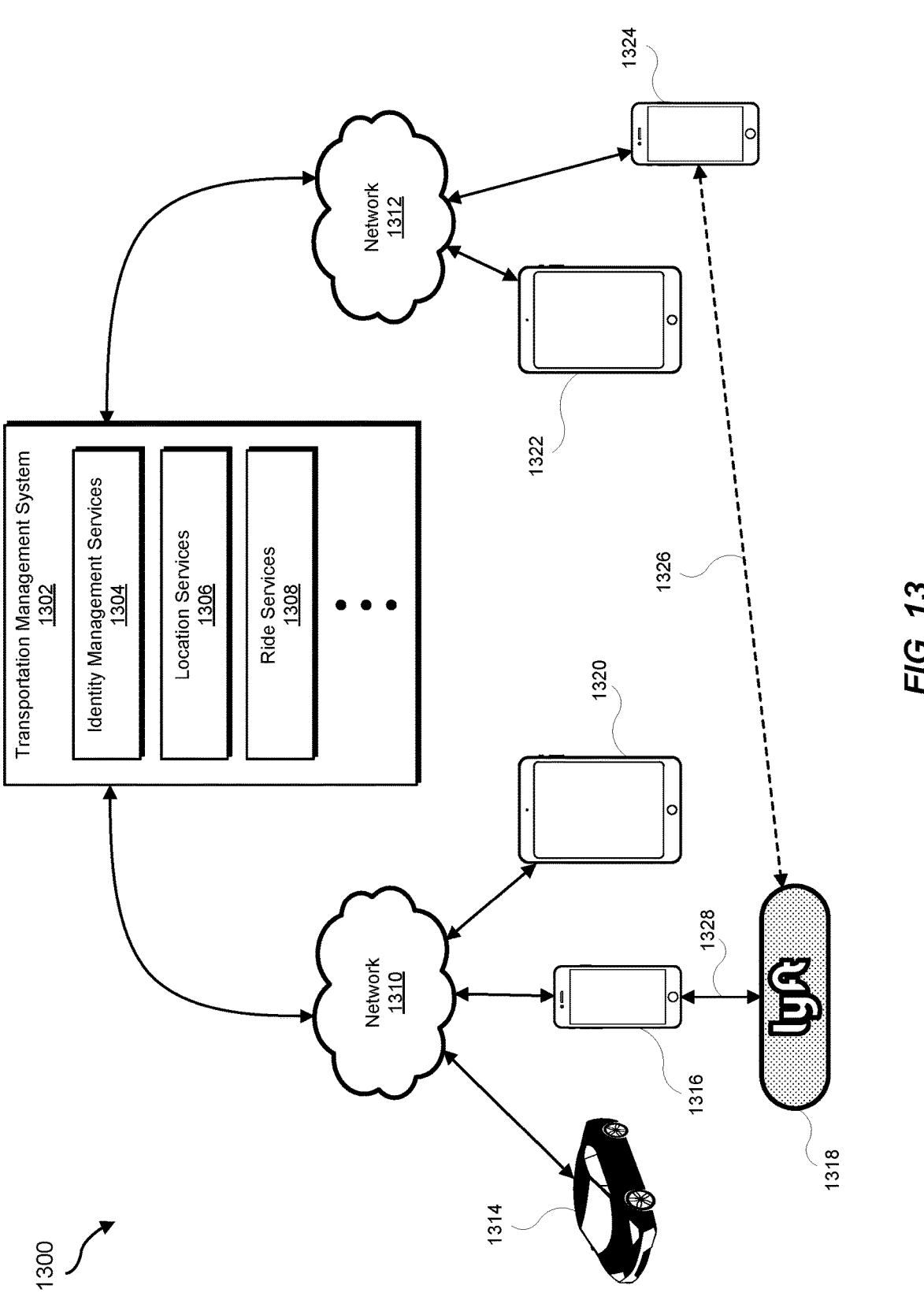
FIG. 13 is an illustration of an example requestor/provider management environment.

FIG. 13 shows a transportation management environment 1300, in accordance with various embodiments. As shown in FIG. 13, a transportation management system 1302 may run one or more services and/or software applications, including identity management services 1304, location services 1306, ride services 1308, and/or other services. Although FIG. 13 shows a certain number of services provided by transportation management system 1302, more or fewer services may be provided in various implementations. In addition, although FIG. 13 shows these services as being provided by transportation management system 1302, all or a portion of any of the services may be processed in a distributed fashion. For example, computations associated with a service task may be performed by a combination of transportation management system 1302 (including any number of servers, databases, etc.), one or more devices associated with a provider (e.g., devices integrated with managed vehicles 1314, provider's computing devices 1316 and tablets 1320, and transportation management vehicle devices 1318), and/or or more or more devices associated with a ride requestor (e.g., the requestor's computing devices 1324 and tablets 1322). In some embodiments, transportation management system 1302 may include one or more general purpose computers, server computers, clustered computing systems, cloud-based computing systems, and/or any other computing systems or arrangements of computing systems. Transportation management system 1302 may be configured to run any or all of the services and/or software components described herein. In some embodiments, the transportation management system 1302 may include an appropriate operating system and/or various server applications, such as web servers capable of handling hypertext transport protocol (HTTP) requests, file transfer protocol (FTP) servers, database servers, etc.

In some embodiments, identity management services 1304 may be configured to perform authorization services for requestors and providers and/or manage their interactions and/or data with transportation management system 1302. This may include, e.g., authenticating the identity of providers and determining that they are authorized to provide services through transportation management system 1302. Similarly, requestors' identities may be authenticated to determine whether they are authorized to receive the requested services through transportation management system 1302. Identity management services 1304 may also manage and/or control access to provider and/or requestor data maintained by transportation management system 1302, such as driving and/or ride histories, vehicle data, personal data, preferences, usage patterns as a ride provider and/or as a ride requestor, profile pictures, linked third-party accounts (e.g., credentials for music and/or entertainment services, social-networking systems, calendar systems, task-management systems, etc.) and any other associated information. Transportation management system 1302 may also manage and/or control access to provider and/or requestor data stored with and/or obtained from third-party systems. For example, a requester or provider may grant transportation management system 1302 access to a third-party email, calendar, or task management system (e.g., via the user's credentials). As another example, a requestor or provider may grant, through a mobile device (e.g., 1316, 1320, 1322, or 1324), a transportation application associated with transportation management system 1302 access to data provided by other applications installed on the mobile device. In some examples, such data may be processed on the client and/or uploaded to transportation management system 1302 for processing.

In some embodiments, transportation management system 1302 may provide ride services 1308, which may include ride matching and/or management services to connect a requestor to a provider. For example, after identity management services module 1304 has authenticated the identity a ride requestor, ride services module 1308 may attempt to match the requestor with one or more ride providers. In some embodiments, ride services module 1308 may identify an appropriate provider using location data obtained from location services module 1306. Ride services module 1308 may use the location data to identify providers who are geographically close to the requestor (e.g., within a certain threshold distance or travel time) and/or who are otherwise a good match with the requestor. Ride services module 1308 may implement matching algorithms that score providers based on, e.g., preferences of providers and requestors; vehicle features, amenities, condition, and/or status; providers' preferred general travel direction and/or route, range of travel, and/or availability; requestors' origination and destination locations, time constraints, and/or vehicle feature needs; and any other pertinent information for matching requestors with providers. In some embodiments, ride services module 1308 may use rule-based algorithms and/or machine-learning models for matching requestors and providers.

Transportation management system 1302 may communicatively connect to various devices through networks 1310 and/or 1312. Networks 1310 and 1312 may include any combination of interconnected networks configured to send and/or receive data communications using various communication protocols and transmission technologies. In some embodiments, networks 1310 and/or 1312 may include local area networks (LANs), wide-area networks (WANs), and/or the Internet, and may support communication protocols such as transmission control protocol/Internet protocol (TCP/IP), Internet packet exchange (IPX), systems network architecture (SNA), and/or any other suitable network protocols. In some embodiments, data may be transmitted through networks 1310 and/or 1312 using a mobile network (such as a mobile telephone network, cellular network, satellite network, or other mobile network), a public switched telephone network (PSTN), wired communication protocols (e.g., Universal Serial Bus (USB), Controller Area Network (CAN)), and/or wireless communication protocols (e.g., wireless LAN (WLAN) technologies implementing the IEEE 802.11 family of standards, Bluetooth, Bluetooth Low Energy, Near Field Communication (NFC), Z-Wave, and ZigBee). In various embodiments, networks 1310 and/or 1312 may include any combination of networks described herein or any other type of network capable of facilitating communication across networks 1310 and/or 1312.

In some embodiments, transportation management vehicle device 1318 may include a provider communication device configured to communicate with users, such as drivers, passengers, pedestrians, and/or other users. In some embodiments, transportation management vehicle device 1318 may communicate directly with transportation management system 1302 or through another provider computing device, such as provider computing device 1316. In some embodiments, a requestor computing device (e.g., device 1324) may communicate via a connection 1326 directly with transportation management vehicle device 1318 via a communication channel and/or connection, such as a peer-to-peer connection, Bluetooth connection, NFC connection, ad hoc wireless network, and/or any other communication channel or connection. Although FIG. 13 shows particular devices communicating with transportation management system 1302 over networks 1310 and 1312, in various embodiments, transportation management system 1302 may expose an interface, such as an application programming interface (API) or service provider interface (SPI) to enable various third parties which may serve as an intermediary between end users and transportation management system 1302.

In some embodiments, devices within a vehicle may be interconnected. For example, any combination of the following may be communicatively connected: vehicle 1314, provider computing device 1316, provider tablet 1320, transportation management vehicle device 1318, requestor computing device 1324, requestor tablet 1322, and any other device (e.g., smart watch, smart tags, etc.). For example, transportation management vehicle device 1318 may be communicatively connected to provider computing device 1316 and/or requestor computing device 1324. Transportation management vehicle device 1318 may establish communicative connections, such as connections 1326 and 1328, to those devices via any suitable communication technology, including, e.g., WLAN technologies implementing the IEEE 802.11 family of standards, Bluetooth, Bluetooth Low Energy, NFC, Z-Wave, ZigBee, and any other suitable short-range wireless communication technology.

In some embodiments, users may utilize and interface with one or more services provided by the transportation management system 1302 using applications executing on their respective computing devices (e.g., 1316, 1318, 1320, and/or a computing device integrated within vehicle 1314), which may include mobile devices (e.g., an iPhone®, an iPad®, mobile telephone, tablet computer, a personal digital assistant (PDA)), laptops, wearable devices (e.g., smart watch, smart glasses, head mounted displays, etc.), thin client devices, gaming consoles, and any other computing devices. In some embodiments, vehicle 1314 may include a vehicle-integrated computing device, such as a vehicle navigation system, or other computing device integrated with the vehicle itself, such as the management system of an autonomous vehicle. The computing device may run on any suitable operating systems, such as Android®, iOS®, macOS®, Windows®, Linux®, UNIX®, or UNIX®-based or Linux®-based operating systems, or other operating systems. The computing device may further be configured to send and receive data over the Internet, short message service (SMS), email, and various other messaging applications and/or communication protocols. In some embodiments, one or more software applications may be installed on the computing device of a provider or requestor, including an application associated with transportation management system 1302. The transportation application may, for example, be distributed by an entity associated with the transportation management system via any distribution channel, such as an online source from which applications may be downloaded. Additional third-party applications unassociated with the transportation management system may also be installed on the computing device. In some embodiments, the transportation application may communicate or share data and resources with one or more of the installed third-party applications.

Figure 14:
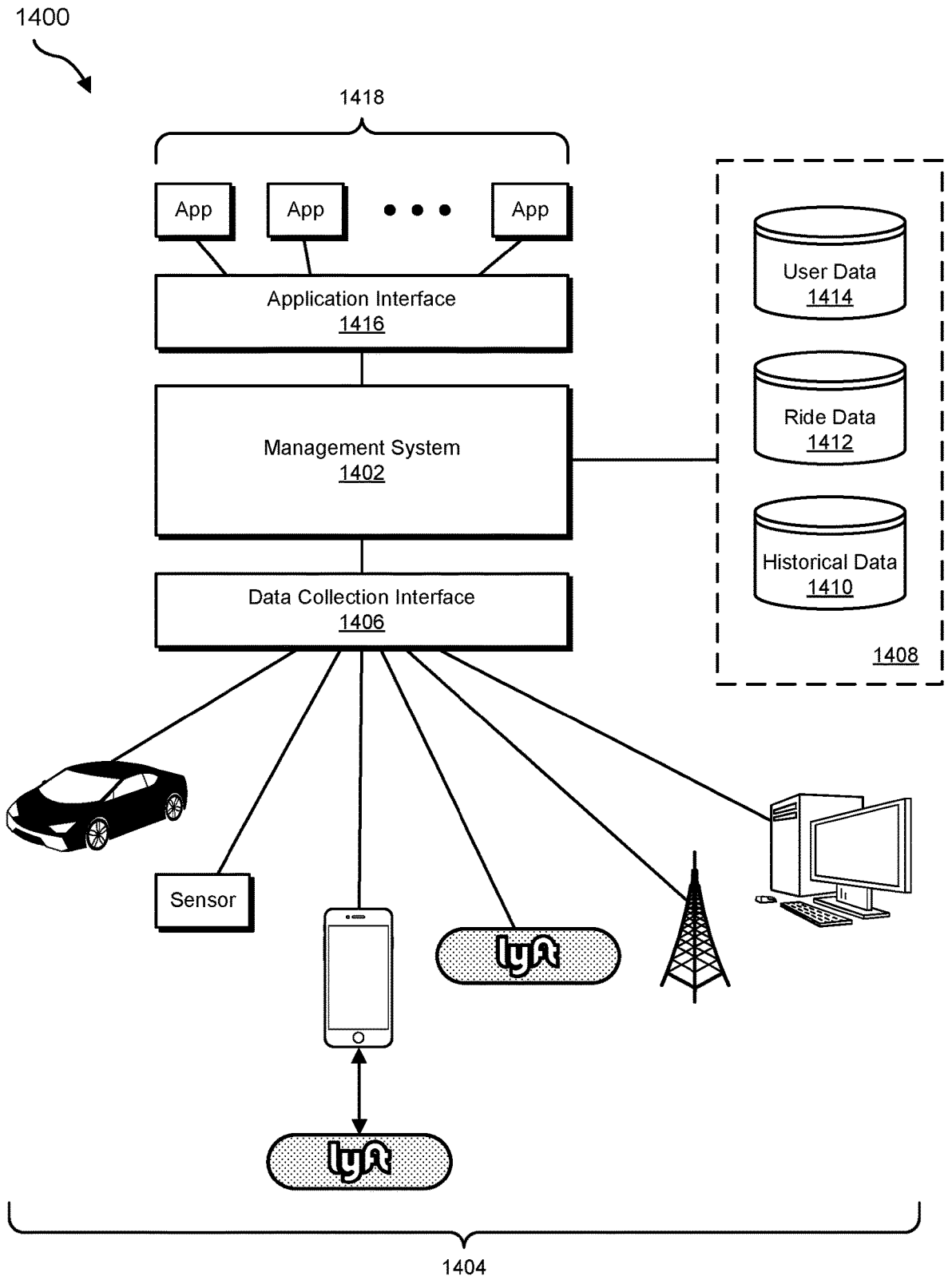
FIG. 14 is an illustration of an example data collection and application management system.

FIG. 14 shows a data collection and application management environment 1400, in accordance with various embodiments. As shown in FIG. 14, management system 1402 may be configured to collect data from various data collection devices 1404 through a data collection interface 1406. As discussed above, management system 1402 may include one or more computers and/or servers or any combination thereof. Data collection devices 1404 may include, but are not limited to, user devices (including provider and requestor computing devices, such as those discussed above), provider communication devices, laptop or desktop computers, vehicle data (e.g., from sensors integrated into or otherwise connected to vehicles), ground-based or satellite-based sources (e.g., location data, traffic data, weather data, etc.), or other sensor data (e.g., roadway embedded sensors, traffic sensors, etc.). Data collection interface 1406 can include, e.g., an extensible device framework configured to support interfaces for each data collection device. In various embodiments, data collection interface 1406 may be extended to support new data collection devices as they are released and/or to update existing interfaces to support changes to existing data collection devices. In various embodiments, data collection devices may communicate with data collection interface 1406 over one or more networks. The networks may include any network or communication protocol as would be recognized by one of ordinary skill in the art, including those networks discussed above.

As shown in FIG. 14, data received from data collection devices 1404 can be stored in data store 1408. Data store 1408 may include one or more data stores, such as databases, object storage systems and services, cloud-based storage services, and other data stores. For example, various data stores may be implemented on a non-transitory storage medium accessible to management system 1402, such as historical data store 1410, ride data store 1412, and user data store 1414. Data stores 1408 can be local to management system 1402, or remote and accessible over a network, such as those networks discussed above or a storage-area network or other networked storage system. In various embodiments, historical data 1410 may include historical traffic data, weather data, request data, road condition data, or any other data for a given region or regions received from various data collection devices. Ride data 1412 may include route data, request data, timing data, and other ride related data, in aggregate and/or by requestor or provider. User data 1414 may include user account data, preferences, location history, and other user-specific data. Although certain data stores are shown by way of example, any data collected and/or stored according to the various embodiments described herein may be stored in data stores 1408.

As shown in FIG. 14, an application interface 1416 can be provided by management system 1402 to enable various apps 1418 to access data and/or services available through management system 1402. Apps 1418 may run on various user devices (including provider and requestor computing devices, such as those discussed above) and/or may include cloud-based or other distributed apps configured to run across various devices (e.g., computers, servers, or combinations thereof). Apps 1418 may include, e.g., aggregation and/or reporting apps which may utilize data 1408 to provide various services (e.g., third-party ride request and management apps). In various embodiments, application interface 1416 can include an API and/or SPI enabling third party development of apps 1418. In some embodiments, application interface 1416 may include a web interface, enabling web-based access to data 1408 and/or services provided by management system 1402. In various embodiments, apps 1418 may run on devices configured to communicate with application interface 1416 over one or more networks. The networks may include any network or communication protocol as would be recognized by one of ordinary skill in the art, including those networks discussed above, in accordance with an embodiment of the present disclosure.

While various embodiments of the present disclosure are described in terms of a ridesharing service in which the ride providers are human drivers operating their own vehicles, in other embodiments, the techniques described herein may also be used in environments in which ride requests are fulfilled using autonomous vehicles. For example, a transportation management system of a ridesharing service may facilitate the fulfillment of ride requests using both human drivers and autonomous vehicles.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules described herein may transform configuration information in conjunction with sensor data into image data and store the image data in and/or transmit the image data to a database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the terms "including" and "having" (and their derivatives), as used in the specification and claims, are interchangeable with and have the same meaning as the word "comprising."

What is claimed is:

1. A computer-implemented method comprising:
identifying, by a server computer system, a provider computing device for use in capturing street-level imagery, wherein the provider computing device controls a camera positioned to capture street-level imagery outside a vehicle associated with the provider computing device;
sending, by the server computer system, instructions to the provider computing device indicating that the camera of the provider computing device is to capture street-level image data;
receiving, by the server computer system, street-level image data captured by the provider computing device using the camera responsive to the instructions, the received street-level image data including one or more features extracted from the street-level image data, the street-level image data including at least one subsequent image of a map feature that has changed, wherein the camera, in further response to the instructions, captures a minimum threshold number of images of the changed map feature;
accessing, by the server computer system, a map for a specified region that includes one or more map features for the region; and
updating, by the server computer system, the map features based on at least one of the extracted features from the street-level image data,
wherein the updating is performed upon determining that at least one of the map features has changed from an initial state to a subsequent, different state, and
wherein the changed map features are updated after a specified time delay has passed, the specified time delay being varied based on a number of secondary provider computing devices that are capturing the changed map features.

2. The computer-implemented method of claim 1, wherein the updating is performed upon reaching the minimum threshold number of images of the changed map feature.

3. The computer-implemented method of claim 1, wherein the changed map feature comprises a temporary change for the map feature that, at a subsequent point in time, returns from the subsequent, different state to the initial state.

4. The computer-implemented method of claim 3, further comprising, upon determining that the temporary change for the map feature has returned to the initial state, updating, by the server computer system, the changed map feature in the map.

5. The computer-implemented method of claim 1, further comprising instructing, by the server computer system, one or more of the secondary provider computing devices to capture secondary street-level image data of the changed map features.

6. A system comprising:
at least one provider computing device, associated with a vehicle, with at least one hardware processor; and
a server computer system, wherein the server computer system:
identifies a provider computing device for use in capturing street-level imagery, wherein the provider computing device controls a camera positioned to capture street-level imagery outside a vehicle associated with the provider computing device;
sends instructions to the provider computing device indicating that the camera of the provider computing device is to capture street-level image data;
receives street-level image data captured by the provider computing device using the camera responsive to the instructions, the received street-level image data including one or more features extracted from the street-level image data, the street-level image data including at least one subsequent image of a map feature that has changed, wherein the camera, in further response to the instructions, captures a minimum threshold number of images of the changed map feature;
accesses a map for a specific region that includes one or more map features for the region; and
updates the map features based on at least one of the extracted features from the street-level image data, wherein the updating is performed upon determining that at least one of the map features has changed from an initial state to a subsequent, different state, and wherein the changed map features are updated after a specified time delay has passed, the specified time delay being varied based on a number of secondary provider computing devices that are capturing the changed map features.

7. The system of claim 6, wherein the updating is performed upon reaching the minimum threshold number of images of the changed map feature.

8. The system of claim 6, wherein the changed map feature comprises a temporary change for the map feature that, at a subsequent point in time, returns from the subsequent, different state to the initial state.

9. The system of claim 8, further comprising, upon determining that the temporary change for the map feature has returned to the initial state, updating, by the server computer system, the changed map feature in the map.

10. The system of claim 6, wherein one or more of the secondary provider computing devices is instructed to capture secondary street-level image data of the changed map features.

11. A non-transitory computer-readable medium comprising one or more computer-readable instructions that, when executed by at least one processor of a computing device, cause the computing device to:

identify a provider computing device for use in capturing street-level imagery, wherein the provider computing device controls a camera positioned to capture street-level imagery outside a vehicle associated with the provider computing device;

send instructions to the provider computing device indicating that the camera of the provider computing device is to capture street-level image data;

receive street-level image data captured by the provider computing device using the camera responsive to the instructions, the received street-level image data including one or more features extracted from the street-level image data, the street-level image data including at least one subsequent image of a map feature that has changed, wherein the camera, in further response to the instructions, captures a minimum threshold number of images of the changed map feature;

access a map for a specific region that includes one or more map features for the region; and update the map features based on at least one of the extracted features from the street-level image data, wherein the updating is performed upon determining that at least one of the map features has changed from an initial state to a subsequent, different state, and wherein the changed map features are updated after a specified time delay has passed, the specified time delay being varied based on a number of secondary provider computing devices that are capturing the changed map features.

* * * * *